US011790116B2

(12) United States Patent
Daub et al.

(10) Patent No.: US 11,790,116 B2
(45) Date of Patent: Oct. 17, 2023

(54) SYSTEMS AND METHODS FOR PRIVACY PRESERVING DETERMINATION OF INTERSECTIONS OF SETS OF USER IDENTIFIERS

(71) Applicant: GOOGLE LLC, Mountain View, CA (US)

(72) Inventors: Michael Daub, Mountain View, CA (US); Scott Schneider, Mountain View, CA (US); Joseph Sean Cahill Goodknight Knightbrook, Mountain View, CA (US); Sheng Ma, Mountain View, CA (US); Laura Book, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 243 days.

(21) Appl. No.: 16/592,190

(22) Filed: Oct. 3, 2019

(65) Prior Publication Data

US 2021/0004487 A1 Jan. 7, 2021

Related U.S. Application Data

(63) Continuation of application No. 16/564,116, filed on Sep. 9, 2019, now abandoned.
(Continued)

(51) Int. Cl.
*G06F 21/62* (2013.01)
*G06F 16/22* (2019.01)
(Continued)

(52) U.S. Cl.
CPC ........ *G06F 21/6254* (2013.01); *G06F 16/212* (2019.01); *G06F 16/2255* (2019.01);
(Continued)

(58) Field of Classification Search
CPC ............ G06F 21/6254; G06F 16/2255; G06F 16/212; G06F 21/6245; G06Q 30/0246;
(Continued)

(56) References Cited

U.S. PATENT DOCUMENTS 8,589,233 B2 11/2013 Flake et al.
8,655,695 B1 2/2014 Qu et al.
(Continued)

FOREIGN PATENT DOCUMENTS

| EP | 2 052 335 | 4/2009 |
| WO | WO-2014/120396 A1 | 8/2014 |
| WO | WO-2017/105730 A1 | 6/2017 |

OTHER PUBLICATIONS

Karaj, A., S. Macbeth, R. Berson, and J. M. Pujol (2018). Whotracks. me: Monitoring the online tracking landscape at scale. CoRR abs/1804.08959.*
(Continued)

*Primary Examiner* — Ilana L Spar
*Assistant Examiner* — Allan J Woodworth, II
(74) *Attorney, Agent, or Firm* — Dority & Manning, P.A.

(57) ABSTRACT

At least one aspect is directed to determining an estimate of an intersection of user identifiers in a first set of user identifiers and a second set of user identifiers. The first and second sets of user identifiers can be populated with user identifiers that have interacted with the same content item or content item campaign. Estimates of intersections of the first and the second sets can be determined based on a binomial vector approach, a vector of counts approach, or a hybrid approach. The binomial vector approach generates vectors based on k hashes of each user identifier in the first set and summing the vectors to generate a first vector. The inter-
(Continued)

section can be determined based on a dot product of the first vector and a second vector similarly generated from the second set of user identifiers.

20 Claims, 14 Drawing Sheets

Related U.S. Application Data

(60) Provisional application No. 62/877,251, filed on Jul. 22, 2019, provisional application No. 62/870,970, filed on Jul. 5, 2019.

(51) Int. Cl.
| | | |
|---|---|---|
| *G06Q 30/0242* | (2023.01) | |
| *H04L 9/40* | (2022.01) | |
| *G06F 16/21* | (2019.01) | |
| *H04L 9/06* | (2006.01) | |

(52) U.S. Cl.
CPC ..... *G06F 21/6245* (2013.01); *G06Q 30/0246* (2013.01); *H04L 9/0643* (2013.01); *H04L 63/0407* (2013.01); *H04L 63/0428* (2013.01)

(58) Field of Classification Search
CPC ............... H04L 9/0643; H04L 63/0407; H04L 63/0428
USPC .............................................. 705/14.1–14.73
See application file for complete search history.

(56) References Cited

U.S. PATENT DOCUMENTS

| | | | |
|---|---|---|---|
| 10,085,073 | B2 | 9/2018 | Ray et al. |
| 10,091,076 | B2 | 10/2018 | Kieviet et al. |
| 10,176,082 | B2 | 1/2019 | Brown et al. |
| 2007/0219984 | A1 | 9/2007 | Aravamudan et al. |
| 2011/0258049 | A1 | 10/2011 | Ramer et al. |
| 2014/0081767 | A1 | 3/2014 | Zhang |
| 2014/0196151 | A1* | 7/2014 | Mishra ................. G06F 16/258 726/26 |
| 2015/0128280 | A1* | 5/2015 | Messer ............... H04L 63/1433 726/25 |
| 2015/0161229 | A1* | 6/2015 | Davies ................ G06F 16/9024 707/737 |
| 2016/0027025 | A1* | 1/2016 | Sanders ............. G06Q 30/0201 705/7.29 |
| 2017/0026352 | A1* | 1/2017 | Salek ...................... H04L 63/06 |
| 2017/0155956 | A1* | 6/2017 | Nagaraja Rao ...... H04N 21/812 |
| 2017/0300528 | A1 | 10/2017 | Qin et al. |
| 2017/0309047 | A1* | 10/2017 | Demiralp .............. G06F 3/0481 |
| 2018/0040011 | A1* | 2/2018 | Milton ............... G06Q 30/0205 |
| 2018/0218168 | A1* | 8/2018 | Goel ...................... G06F 16/22 |
| 2018/0225708 | A1 | 8/2018 | Ferber et al. |
| 2018/0300363 | A1 | 10/2018 | Ertl |
| 2020/0064783 | A1 | 2/2020 | Tran et al. |
| 2020/0160401 | A1* | 5/2020 | Hassan ................. G06F 3/0482 |
| 2021/0110456 | A1 | 4/2021 | Chokhawala et al. |

OTHER PUBLICATIONS

Araujo et al., "Balancing on the Edge: Transport Affinity without Network State", Proceedings of the 15th USENIX Symposium on Networked Systems Design and Implementation (NSDI '18), Apr. 9-11, 2018, retrieved May 9, 2021 from URL: https://www.usenix.org/system/files/conference/nsdi18/nsdi18-araujo.pdf (15 pages).

Non-Final Office Action for U.S. Appl. No. 16/564,130 dated May 27, 2021 (21 pages).

Non-Final Office Action for U.S. Appl. No. 16/592,110 dated May 13, 2021 (22 pages).

Vu et al., "Blockchain-based Content Delivery Networks: Content Transparency Meets User Privacy", Jan. 22, 2019, retrieved May 9, 2021 from URL: https://arxiv.org/pdf/1901.07622.pdf (14 pages).

International Search Report and Written Opinion for PCT Appln. Ser. No. PCT/US2020/035276 dated Sep. 25, 2020 (13 pages).

International Search Report and Written Opinion for PCT Appln. Ser. No. PCT/US2020/035281 dated Sep. 9, 2020 (16 pages).

\* cited by examiner

SYSTEMS AND METHODS FOR PRIVACY PRESERVING DETERMINATION OF INTERSECTIONS OF SETS OF USER IDENTIFIERS

CROSS-REFERENCE TO RELATED APPLICATIONS

This application claims priority and is a continuation of to U.S. patent application Ser. No. 16/564,116 filed on Sep. 9, 2019,
which itself claims priority to U.S. provisional patent application Ser. No. 62/870,970 filed on Jul. 5, 2019, and to U.S. provisional patent application Ser. No. 62/877,251 filed on Jul. 22, 2019,
and to, U.S. provisional patent application Ser. No. 62/870,970 filed on Jul. 5, 2019, and to U.S. provisional patent application Ser. No. 62/877,251 filed on Jul. 22, 2019, the contents of each of which are incorporated herein by reference.

BACKGROUND

In a computer networked environment such as the internet, third-party content providers provide third-party content items for display on end-user computing devices. These third-party content items, for example, advertisements, can be displayed on a web page associated with a respective publisher. These third-party content items can include content identifying the third-party content provider that provided the content item.

SUMMARY

One technical issue addressed by the present disclosure is the difficulty in determining the total number of interactions between users and a set of content items from two different content delivery platforms by a third party while maintaining the privacy of the users. For example, a third party may want to estimate the total number of user interactions with a certain set of content items across two separate content delivery platforms. However, sending all the information about the users and their interactions to the third party from each content delivery platform will provide the third party with private information about each user. The challenges addressed in this disclosure relate to providing the third party with enough data to estimate the total interactions the users with a certain set of content items while maintaining the privacy of the users of each content delivery platform.

By hashing each user interaction, one is able to preserve the privacy of the users while maintaining some information about the user interactions. This information is a deterministic set of bits that can be used in further computation, but contains no specific information about the individual users or their interactions. Pieces of these hashes can be used to construct data structures called vectors. A user interaction that is present on two different content delivery platforms will have the same quantitative contribution to the vector of each platform, because the hashing operations used on the user interaction data is deterministic. The vector can be sent to a third party which is capable of processing vectors from two different content delivery platforms to estimate the total number of user interactions with a set of content items across both platforms using statistical analysis.

This application claims priority to provisional application 62/870,970 filed on Jul. 5, 2019, and provisional application 62/877,251 filed on Jul. 22, 2019. The contents of each are incorporated within here by reference.

At least one aspect is directed to a method for estimating the number of unique user interactions with a set of content items provided by different content delivery platforms. The method includes transmitting, via a network, a set of hash functions to a first content delivery platform. The method further includes transmitting, via a network, the set of hash functions to a second content delivery platform. The method also includes receiving, via a network, a first vector from the first content delivery platform, each coordinate of the first vector being equal to a sum based on a plurality of hashes, with each hash calculated from one of a plurality of user interactions with the set of content items occurring via the first content delivery platform. The method also includes receiving, via a network, a second vector from the second content delivery platform, each coordinate of the second vector being equal to a sum based on a plurality of hashes, with each hash calculated from one of a plurality of user interactions with the set of content items occurring via the second content delivery platform. The method further includes estimating a number of user interactions with the set of content items occurring via the first content delivery platform based on a sum of the elements of the first vector. The method also includes estimating a number of user interactions with the set of content items occurring via the second content delivery platform based on a sum of the elements of the second vector. The method further includes estimating a number of unique user interactions with the set of content items provided by both the first content delivery platform and the second content delivery platform based on the number of user interactions with the set of content items occurring via the first content delivery platform, the number of user interactions with the set of content items occurring via the second content delivery platform, and a dot product of the first and the second vector.

In some implementations, the method includes transmitting, via a network, a first request for a first vector to a first content delivery platform. In some implementations, the method includes transmitting, via a network, a second request for a second vector to a second content delivery platform. In some implementations, the first request comprises a set of hash functions. In some implementations the second request comprises a set of hash functions. In some implementations, the method comprises estimating the total number of user interactions with the set of content items occurring via the first content delivery network based on twice the total sum of all coordinates in the first vector divided by the number of coordinates in the first vector. In some implementations, the method comprises estimating the total number of user interactions with the set of content items occurring via the second content delivery network based on twice the total sum of all coordinates in the second vector divided by the number of coordinates in the second vector. In some implementations, the method comprises estimating a number of unique user interactions with the set of content items provided by the both the first content delivery platform and the second content delivery platform based on the number of user interactions with the set of content items occurring via the first content delivery platform, the number of user interactions with the set of content items occurring via the second content delivery platform, and the covariance of the first vector and the second vector.

At least another aspect is directed to a method for providing anonymous data about user interactions with a set of content items. The method includes receiving, via a network, data to identify a set of hash functions. The method further includes retrieving a plurality of user identifiers, each of the user identifiers identifying interaction with a set of content items by a respective user of the plurality. The method further includes for each of the plurality of user identifiers, generating k hashes of the user identifier, each hash corresponding to one of the set of hash functions, and generating a user vector, each coordinate of the user vector corresponding to a bit value of a respective hash. The method also includes generating an interaction vector by summing the plurality of generated user vectors. The method further includes transmitting, via a network, the generated interaction vector via a network to the requesting party.

At least another aspect is directed to a method for providing anonymous data about user interactions with a set of content items. The method includes receiving, via a network, a request via a network for an interaction vector from a requesting party, the request comprising data to identify a hash function. The method further includes retrieving a plurality of user identifiers, each of the user identifiers identifying interaction with a set of content items by a respective user of the plurality. The method also includes for each of the plurality of user identifiers, generating a hash value of the user identifier using the hash function included in the request, determining a value of a first m-bits of the hash value, and incrementing a count of a register corresponding to the value, the register being one of k registers, where k=2^m. The method also includes generating an interaction vector, each coordinate of the interaction vector being equal to a count of a corresponding kth register. The method further includes transmitting, via a network, the generated interaction vector via a network to the requesting party.

In another aspect, the present disclosure is directed to a system comprising one or more processors configured to estimate the number of unique user interactions with a set of content items provided by different content delivery platforms. In some implementations, the one or more processors are configured to transmit, via a network, a set of hash functions to a first content delivery platform. In some implementations, the one or more processors are configured to transmit, via a network, the set of hash functions to a second content delivery platform. In some implementations the one or more processors are configured to receive, via a network, a first vector from the first content delivery platform, each coordinate of the first vector being equal to a sum based on a plurality of hashes, with each hash calculated from one of a plurality of user interactions with the set of content items occurring via the first content delivery platform. In some implementations, the one or more processors are configured to receive, via a network, a second vector from the second content delivery platform, each coordinate of the second vector being equal to a sum based on a plurality of hashes, with each hash calculated from one of a plurality of user interactions with the set of content items occurring via the second content delivery platform. In some implementations, the one or more processors are configured to estimate a number of user interactions with the set of content items occurring via the first content delivery platform based on a sum of the elements of the first vector. In some implementations, the one or more processors are configured to estimate a number of user interactions with the set of content items occurring via the second content delivery platform based on a sum of the elements of the second vector. In some implementations, the one or more processors are configured to estimate a number of unique user interactions with the set of content items provided by both the first content delivery platform and the second content delivery platform based on the number of user interactions with the set of content items occurring via the first content delivery platform, the number of user interactions with the set of content items occurring via the second content delivery platform, and a dot product of the first vector and the second vector.

In another aspect, the present disclosure is directed to a system comprising one or more processors configured to provide anonymous data about user interactions with a set of content items. In some implementations, the one or more processors are configured to receive, via a network, data to identify a set of hash functions. In some implementations, the one or more processors are configured to retrieve a plurality of user identifiers, each of the user identifiers identifying interaction with a set of content items by a respective user of the plurality. In some implementations, the one or more processors are configured to, for each of the plurality of user identifiers, generate k hashes of the user identifier, each hash corresponding to one of the set of hash functions, and generate a user vector, each coordinate of the user vector corresponding to a bit value of a respective hash. In some implementations, the one or more processors are configured to generate an interaction vector by summing the plurality of generated user vectors. In some implementations, the one or more processors are configured to transmit, via a network, the generated interaction vector.

In another aspect, the present disclosure is directed to a system comprising one or more processors, the processors configured to provide anonymous data about user interactions with a set of content items. In some implementations, the one or more processors are configured to receive, via a network, data to identify a set of hash functions. In some implementations, the one or more processors are configured to retrieve a plurality of user identifiers, each of the user identifiers identifying interaction with a set of content items by a respective user of the plurality. In some implementations, the one or more processors are configured to, for each of the plurality of user identifiers, generate a hash value of the user identifier using the hash function included in the request, determine a value of a first m-bits of the hash value, and increment a count of a register corresponding to the value, the register being one of k registers, where k=2^m. In some implementations, the one or more processors are configured to generate an interaction vector, each coordinate of the interaction vector being equal to a count of a corresponding kth register. In some implementations, the one or more processors are configured to transmit, via a network, the generated interaction vector.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Below are detailed descriptions of various concepts related to, and implementations of, methods, apparatuses, and systems of privacy preserving determination of intersection of sets of user identifiers. The various concepts introduced above and discussed in greater detail below may be implemented in any of numerous ways, as the described concepts are not limited to any particular manner of implementation.

Figure 1:
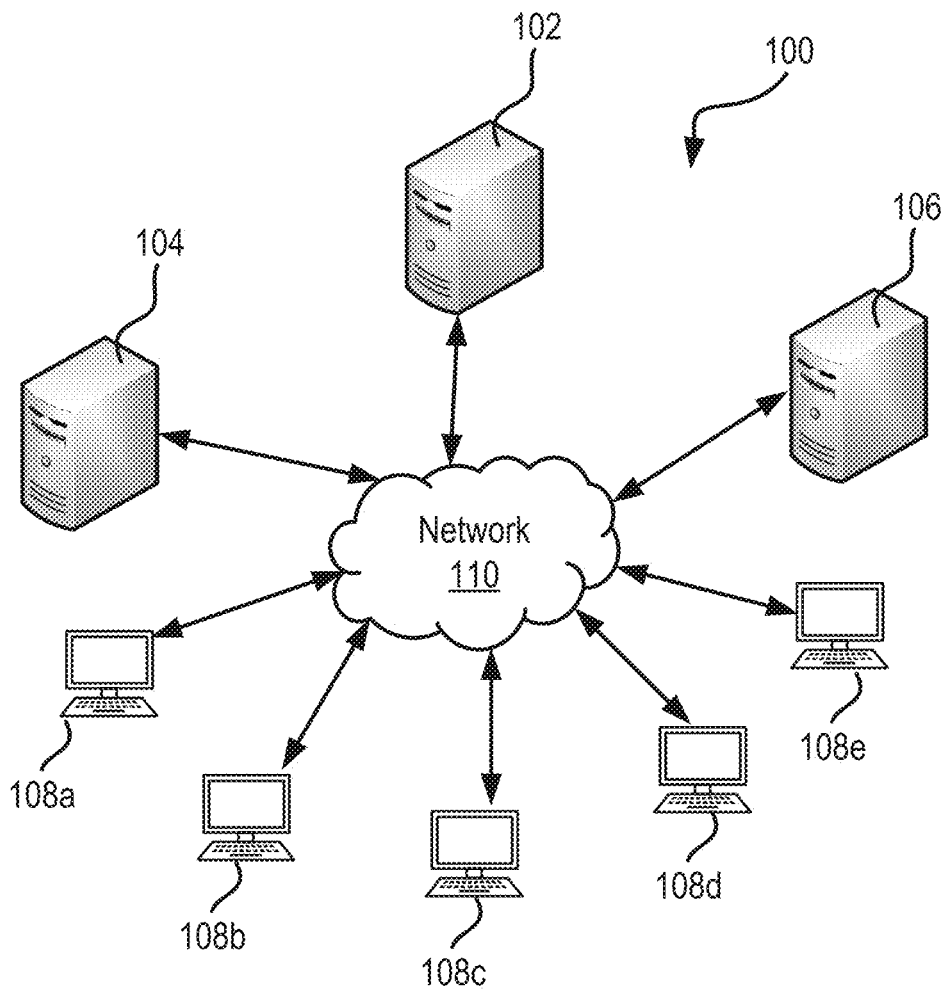
FIG. 1 depicts a block diagram of an example implementation of a networked computer system, according to an illustrative implementation.

FIG. 1 depicts a block diagram of an example implementation of a networked computer system 100. The system 100 includes a first data computing system 102, a second data computing system 104, and a third data computing system 106. The system 100 can also include a plurality of user devices 108a-108e (collectively referred to as user devices 108). The first, second, and third data computing systems 102, 104, and 106, and the user devices 108 can communicate over a network 110, which can include one or more of a local area networks, a wide area network, private networks, public networks, and the Internet. In some examples, the first data computing system 102 can be a content item (e.g., ads) provider that can provide content items for distribution and rendering on the user devices 108. The second data computing system 104 and the third data computing system can be content item distribution systems that distribute the content items to the user devices based on, for example, the content provided to the user devices. As an example, users on the user devices 108 can be provided with content such as, for example, web pages or audio-visual content. The content can include content item slots (e.g., positional or temporal) for displaying content items along with the content. The requests for displaying content items in the content item slots can be received by the content item distribution systems. The requests can include a user device identifier identifying the user device 108 and additional information related to the user device, the content provided to the user device 108, etc. The content item distribution system can utilize the information included in the content item request to select a content item, and provide the content item to the user device 108 to be rendered along with the provided content. The content item provided to the user device 108 can be part of a content item campaign run by, for example, the first data computing system 102.

The content item distribution system, or content delivery platform, such as the first data computing system 104 and the second data computing system 106 can keep records of the user identifiers related to the content items provided to the user devices 108. These records can include, for example, a list of user identifiers associated with users or user devices that were rendered with a particular set of content items or that interacted (e.g., clicked on) with the content item. These lists of user identifiers are sometimes referred to as "sketches." A publisher, such as the first data computing system 102, can determine the effectiveness of a content item or a content item campaign by analyzing the sketches received from the content item distribution systems. For example, the publisher can determine the effectiveness of a content item campaign by determining the number of users that interacted with the content items in the content item campaign. The publisher can request the content item distribution systems to provide the publisher with sketches associated with the content item campaign. A sketch can include user identifiers of the users or user devices that interacted with the content item campaign. The publisher may add the number of user identifiers included in the received sketches to determine the number of users that interacted with the content item. However, sketches received from two different content item distribution systems may include duplicate user identifiers, resulting in counting the duplicate user identifiers twice, and therefore, resulting in an inaccurate count. The duplicate identifiers can be a result of, for example, same users or user devices interacting with the same content item distributed by the two content item distribution systems. To determine the actual number of users that interacted with the content item, the publisher needs to remove duplicate user identifiers. One approach to removing the duplicate identifiers can be to determine the intersection of the two sketches, where the intersection includes the user identifiers that are common to both sketches, and then removing that number from the sum of the sketches to arrive at the actual count of unique user identifiers of users that interacted with the content item.

However, determining the intersection of the two sets of user identifiers can be computationally costly. For example, in some instances, each sketch can include hundreds of thousands if not millions of user identifiers. Determining unique set of user identifiers from the two large sets can be computationally costly or even infeasible. In some instances, cardinality estimation algorithms can be utilized to determine an estimate of the unique number of user identifiers in the sketches. Examples of cardinality estimation algorithms can include hyperloglog, probabilistic counting with stochastic averaging (PCSA), kth minimal value (KMV), etc. Each of these algorithms can estimate the cardinality, i.e., a unique number of members in a multiset, in a computationally efficient manner. However, these algorithms can indicate information on individual members of the sketches.

The following discusses a set of approaches that can be utilized in determining the intersection of the sketches in a computationally efficient manner that also preserves the privacy of the user identifiers in the sketches. In particular, three approaches: a binomial vector approach, a vector of counts approach, and a hybrid approach are discussed, each of which can determine the user identifiers at the intersection of two sketches while preserving the privacy of the user identifiers in those sketches.

Figure 2:
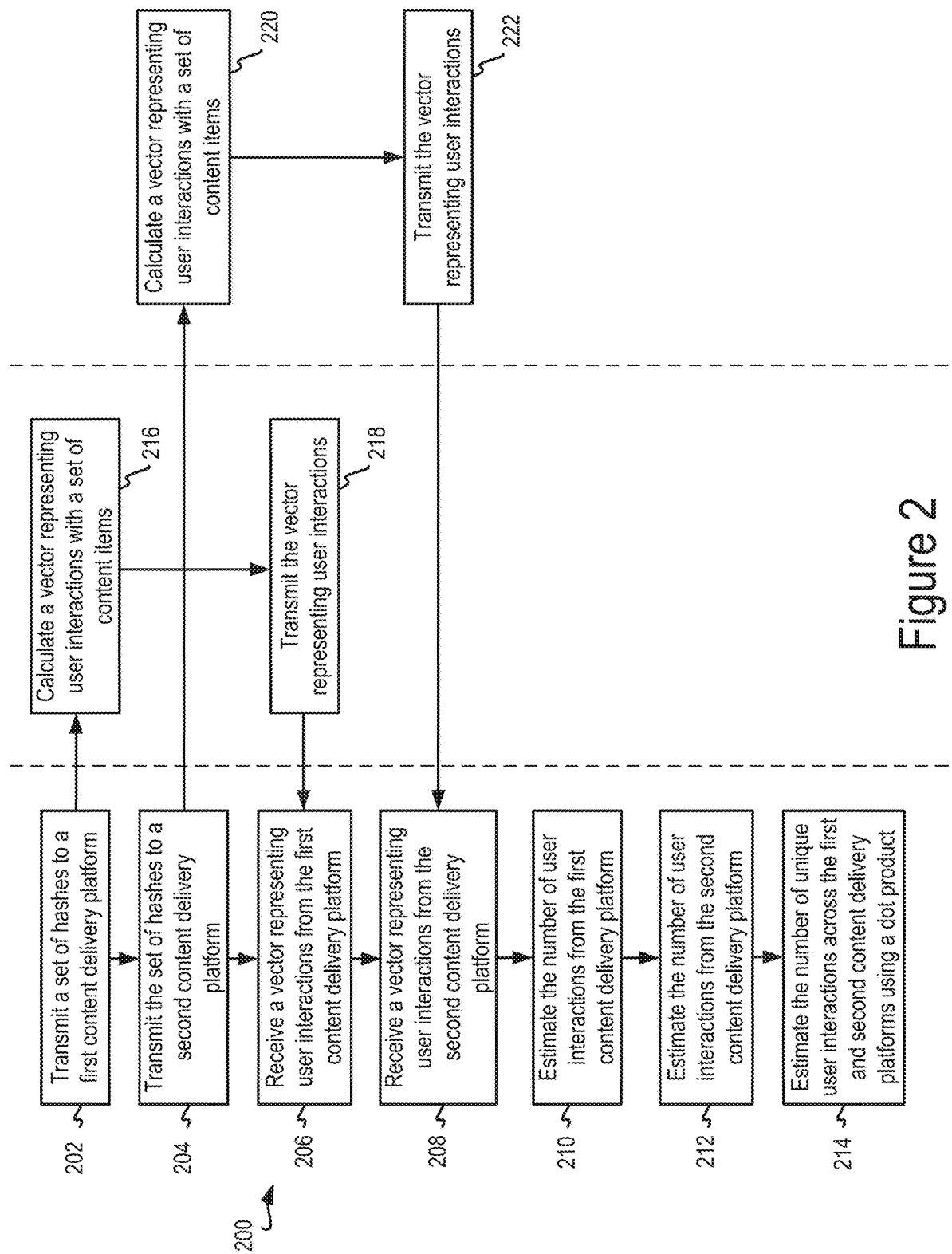
FIG. 2 shows a flow diagram illustrating one embodiment of a method for estimating the number of unique user interactions with a set of content items across a first content delivery platform and a second content delivery platform.

FIG. 2 shows a flow diagram of method 200, which is an example embodiment of a method to estimate the number of unique user interactions with a set of content items provided by different content delivery platforms. The method 200 can be executed on system 100 to determine, for example, the intersection 306 of the first and second sets of user identifiers 302 and 304 shown in FIG. 3. This process stage can be executed, for example, by the first data processing system 102, which can receive the first set of user identifiers 302 and the second set of user identifiers 304 shown in FIG. 3.

In brief overview of FIG. 2, the method to estimate the number of unique user interactions may include transmitting a set of hashes to a first content delivery platform 202. The first content delivery platform may calculate a vector representing user interactions with a set of content items provided by the first content delivery platform 216. The method may transmit the set of hashes to a second content delivery platform 204. The second content delivery platform may calculate a vector representing user interactions with the set of content items provided by the second content delivery platform 220. The first content delivery platform may transmit the vector representing user interactions provided by the first content delivery platform 218. The method may receive a vector representing user interactions from the first content delivery platform 206. The second content delivery platform may transmit the vector representing user interactions provided by the second content delivery platform 222. The method may receive the vector representing user interactions from the second content delivery platform 208. The method may estimate the number of user interactions from the first content delivery platform 210. The method may estimate the number of user interactions from the second content delivery platform 212. The method may finally estimate the number of unique user interactions with the set of content items across both the first and second content delivery platforms using a dot product operation on the two vectors 214.

In further detail of step 202, a set of hashes is transmitted to the first content delivery platform. The set of hashes may contain many hashes. The set of hashes may contain only one hash. The set of hashes may contain the identity hash function. The set of hashes may be transmitted as part of a request for user interaction data from the first content delivery platform. The set of hashes may be transmitted over the network 110. In some implementations, the set of hash functions may be identifiers directing the first content delivery platform to use certain hash functions. In some implementations, the set of hash functions may be a single binary containing computer instructions to execute a set of hash functions. In some implementations, the set of hash functions may be many binaries, each binary containing computer instructions to execute a hash function. In some implementations, the set of hash functions may be many binaries, each binary containing code to execute a subset of the hash functions in the set of hash functions.

In further detail of step 204, a set of hashes is transmitted to the second content delivery platform. The set of hashes may contain many hashes. The set of hashes may contain only one hash. The set of hashes may contain the identity hash function. The set of hashes may be transmitted as part of a request for user interaction data from the first content delivery platform. The set of hashes may be transmitted over the network 110. In some implementations, the set of hash functions may be identifiers directing the second content delivery platform to use certain hash functions. In some implementations, the set of hash functions may be a single binary containing computer instructions to execute a set of hash functions. In some implementations, the set of hash functions may be many binaries, each binary containing computer instructions to execute a hash function. In some implementations, the set of hash functions may be many binaries, each binary containing code to execute a subset of the hash functions in the set of hash functions.

In further detail of step 206, the method receives a first vector representing user interactions from the first content delivery platform. In some implementations, the vector may be a binomial vector of counts. In some implementations, the number of coordinates in the vector is equal to the number of hash functions in the set of hash functions. In some implementations, each coordinate in the vector could correspond to a hash function in the set of hash functions. In some embodiments, each coordinate of the vector could be equal to the sum of a single bit of the hashes of each user identifier provided by the first content delivery platform, where each coordinate corresponds to a hash function in the set of hash functions. In some implementations, the number of coordinates in the vector could be equal to $2^k$, where k is the number of hash functions in the set of hash functions. In some implementations, while receiving the first vector representing user interactions from the first content delivery platform, the method 200 may also receive the number of user identifiers that interacted with the set of content items from the first content delivery platform.

In further detail of step 208, the method receives a second vector representing user interactions from the second content delivery platform. In some implementations, the vector may be a binomial vector of counts. In some implementations, the number of coordinates in the vector is equal to the number of hash functions in the set of hash functions. In some implementations, each coordinate in the vector could correspond to a hash function in the set of hash functions. In some embodiments, each coordinate of the vector could be equal to the sum of a single bit of the hashes of each user identifier provided by the first content delivery platform, where each coordinate corresponds to a hash function in the set of hash functions. In some implementations, the number of coordinates in the vector could be equal to $2^k$, where k is the number of hash functions in the set of hash functions. In some implementations, while receiving the second vector representing user interactions from the second content delivery platform, the method 200 may also receive the number of user identifiers that interacted with the set of content items from the second content delivery platform.

In some implementations, the cardinality of the first vector and the second vector can be the same. In some implementations, the cardinality of the first vector and the second vector will be different. The cardinality of the first vector can be a power of two. The cardinality of the second vector can be a power of two. In some embodiments, the method 200 may determine either the first vector to have a larger cardinality than the second vector or the second vector to have a larger cardinality than the first vector. In such embodiments, the method 200 may down-sample the larger of the two vectors to match the cardinality of the smaller of the two vectors. In such embodiments, the vectors may both have a cardinality that is equal to a power of two. The down-sampling may be performed by summing the values in the coordinates of the larger vector congruent to the modulus of the cardinality of the smaller vector. In a non-limiting example, consider the first vector having a cardinality of 8, and the second vector having a cardinality of 4. To make the cardinality of the first vector and the second vector equal, down-sampling is performed on the first vector. In this non-limiting exampling embodiment, down-sampling is performed by summing the last four coordinates of the first vector with the first four coordinates of the first vector, to generate a vector with cardinality four.

In further detail of step 210, the method estimates the total number of user interactions from the first content delivery platform. In some implementations, the number of user interactions is based off the vector provided by the first content delivery platform in step 206. The number of user interactions can be estimated by summing each coordinate in the vector of user interactions provided by the first content delivery platform and dividing that sum by the number of coordinates in the vector. The number of user interactions can be estimated by summing each coordinate in the vector of user interactions provided by the first content delivery platform, multiplying that number by two, and dividing by the number of coordinates in the vector. The estimated number of user interactions can also be received from the first content delivery platform, for example over network 110. In some embodiments, the exact number of user interactions can also be received from the first content delivery platform, for example over network 110. In such embodiments, the exact value is used by the method 200 as the estimated value.

In further detail of step 212, the method estimates the total number of user interactions from the second content delivery platform. In some implementations, the number of user interactions is based off the vector provided by the second content delivery platform in step 208. The number of user interactions is estimated by summing each coordinate in the vector of user interactions provided by the second content delivery platform and dividing that sum by the number of coordinates in the vector. The number of user interactions is estimated by summing each coordinate in the vector of user interactions provided by the second content delivery platform, multiplying that number by two, and dividing by the number of coordinates in the vector. The estimated number of user interactions can also be received from the second content delivery platform, for example over network 110. In some embodiments, the exact number of user interactions can also be received from the second content delivery platform, for example over network 110. In such embodiments, the exact value is used by the method 200 as the estimated value.

In further detail of step 214, the method can estimate the number of unique user interactions with the set of content items provided by the first and second content delivery platforms using a dot product. The estimate of the number of unique user interactions can be equal to the sum of the estimated number of user interactions from the first and second content delivery platforms, minus the intersection of the sets 306. In some implementations, a dot product is used to calculate the intersection of the sets 306 based on the vectors received in steps 206 and 208. In some implementations, the intersection between sets 306 is calculated by multiplying the dot product of the vectors received in steps 206 and 208 by four and dividing by the number of coordinates in the vectors. In some implementations, the intersection between sets 306 is calculated by multiplying the covariance of the vectors received in steps 206 and 208 by four. In some implementations, the intersection between the sets 306 can be calculated by taking the dot product of a plurality of vectors of counts, and taking the average of the plurality of dot products.

In a non-limiting example embodiment of step 214, the intersection of the sets 206 must first be calculated based on the first vector and the second vector received in step 206 and 208 respectively. In the example embodiment described herein, both the first and second vectors are vectors of counts generated using method 500. Because each vector is based on a sum of the user identifiers, each vector can be considered the sum of three different vectors: a vector representing user identifiers that are present on the first and second content delivery platforms (represented below as z), user identifiers that are unique to the first or second content delivery platform (represented below as u), and a vector of noise (represented below as e). The expected value (i.e. estimate) of the dot product of the first and second vectors can be represented by the equation below:

$$E(v_1 \cdot v_2) = E[(z+u_1+e_1) \cdot (z+u_1+e_1)]$$

When written in an expanded form, the equation above can be written as:

$$E(v_1 \cdot v_2) = E(z \cdot z) + E(z \cdot u_1) + E(z \cdot u_2) + E(u_1 \cdot u_2) + E(z \cdot e_1) + E(z \cdot e_1) + E(u_2 \cdot e_1) + E(u_1 \cdot e_2) + E(e_1 \cdot e_2)$$

In this example, if the noise terms are drawn from zero-centered distributions and are independent from all other terms, their expected value of their dot products is equal to zero. Therefore, all terms in the above equation containing noise from either the first vector ($e_1$) or second vector ($e_2$) are equal to zero. In this example, the first vector and second vector are mean subtracted (i.e., the average of all coordinates of each vector is subtracted from each coordinate of the respective vector). Further, because they are unique to either first or second vector, the disjoint portions of the two vectors $u_1$ and $u_2$ are considered independent. Therefore, the expected values of their dot products are also zero. In this non-limiting example, with the assumptions made above, the equation listed above is reduced to the equation provided below.

$$E(v_1 \cdot v_2) = E(z \cdot z)$$

In further detail of the non-limiting example above, consider that a user identifier from the first content delivery platform has a probability $1/k$ of contributing to any one coordinate of the first vector, where the first vector has a cardinality of k. In the interest of this non-limiting example, the same assumptions are made for the second vector, except based on the user identifiers from the second content delivery platform. In this example, each coordinate of the first and second vectors approximate a binomial distribution with probability 1/k and number of trials $N_i$, where the number of trials is equal to the number of user identifiers that contribute to the respective vector. For a large value of $N_i$, the distribution for any coordinate could be approximated by a Guassian distribution with variance as shown below.

$$Var[v_i(j)] = N_i(k-1)/k^2$$

In the equation above, $v_i(j)$ represents the jth coordinate of vector $v_o$, where i represents either the first or second vector. To continue the analysis of the non-limiting example, consider the expanded form of the expected value of the dot product of the first and second vector below.

$$E(v_1 \cdot v_2) = E(z \cdot z) = \sum_{j=1}^{k} \left[ z(j)^2 \right]$$

In the equation above, $z(j)$ represents the jth coordinate of the vector z, which is defined above. Based on our previous analysis, $z(j)$ must also be approximated with a Gaussian distribution. Therefore, in this non-limiting example, we can simplify the above equation to the one provided below.

$$E(z \cdot z) = \sum_{j=1}^{k} E\left[ z(j)^2 \right] = \sum_{j=1}^{k} \text{Var}(z(j)) = \frac{N_{12}(k-1)}{k}$$

In the equation above, $N_{12}$ represents the number of user identifiers that have interacted with a set of content items on both the first and second content delivery platforms. Note that for a sufficiently large k, the value of (k−1)/k is about equal to 1. Therefore, in a final simplification step, one could arrive at the equation below.

$$E(v_1 \cdot v_2) = E(z \cdot z) = \frac{N_{12}(k-1)}{k} \approx N_{12}$$

Therefore, in this non-limiting example, based on the assumptions made above, one could calculate the number of user interactions common to both content delivery platforms by using a dot product. In some embodiments, this example could be used as a part of step 214 to calculate the number of unique user interactions across both the first and second content delivery platform. In this example, the variance of the estimated value of the number of user interactions common to both content delivery platforms is described in the equation below.

$$\text{Var}(\tilde{N}_{12}) = \frac{N_1 N_2 + N_{12}^2}{k} + \frac{2(N_1 + N_2)}{\varepsilon^2} + \frac{4k}{\varepsilon^4}$$

In the above equation, ε is equal to the inverse of the Laplacian noise scale.

In further detail of step 216, the first content delivery platform can calculate a vector representing user interactions with a set of content items provided by the first content delivery platform The systems and methods for calculating the vector representing user interactions with a set of content items provided by the first content delivery platform are elaborated upon later in the specification. In further detail of step 218, the first content delivery platform can transmit the vector representing user interactions calculated in step 216 over a network, for example, network 110, to be used in method 200. In some implementations, step 218 may also include sending the exact number of user interactions represented by the vector to be used in method 200. In some implementations, step 218 may also include sending an estimate the number of user interactions represented by the vector to be used in method 200. The systems and methods for calculating and transmitting the vector representing user interactions with a set of content items provided by the first content delivery platform are elaborated upon later in the specification.

In further detail of step 220, the first content delivery platform can calculate a vector representing user interactions with a set of content items provided by the first content delivery platform. The systems and methods for calculating the vector representing user interactions with a set of content items provided by the first content delivery platform are elaborated upon later in the specification. In further detail of step 222, the first content delivery platform can transmit the vector representing user interactions calculated in step 220 over a network to be used in method 200. In some implementations, step 222 may also include sending the number of user interactions represented by the vector to be used in method 200. The systems and methods for calculating and transmitting the vector representing user interactions with a set of content items provided by the first content delivery platform are elaborated upon later in the specification.

In some embodiments, the first data processing system executes method 200. In some embodiments, the first data processing system 102 can determine the intersection 306 of FIG. 3 based on the following expression:

$$r = 4\text{Cov}(Zx, Zy) \approx$$
$$\frac{4}{k}(zx_1 zy_1 + \ldots + zx_k zy_k) - \frac{4}{k^2}(zx_1 + \ldots + zx_k)(zy_1 + \ldots + zy_k)$$

Where r represents an estimate of the number of user identifiers that appear in both the first set of user identifiers 302 and the second set of user identifiers 304. In some implementations, the first data processing system 102 can subtract an expected value of n/2 from each position in the first vector and the second vector before generating the value for r. In such instances, the first data processing system 102 can determine the intersection r based on the following expression:

$$r = 4\text{Cov}(Zx, Zy) \approx \frac{4}{k}(zx_1 zy_1 + \ldots + zx_k zy_k)$$

In some embodiments, the first data processing system 102 can estimate the size n of the first vector based on the sum of the values of all k-positions of the k-length first vector $Zx_k$. In some embodiments, the For example, the first data processing system 102 can determine the size n based on the following expression:

$$n \approx \frac{2}{k}(zx_1 + \ldots + zx_k)$$

In some embodiments, the previous expression can be used in step 210 and step 212 of method 200. In some embodiments, the sum computed as a part of the above expression is computer by either the second data processing system 104 or the third data processing system 106. The first data processing system 102 can similarly determine the size n of the second set of user identifiers 204 based on the second k-length vector $Zy_k$. The sizes of the respective first and second vectors can then be used to subtract the respective value n/2 from the first and the second vectors.

Figure 7:
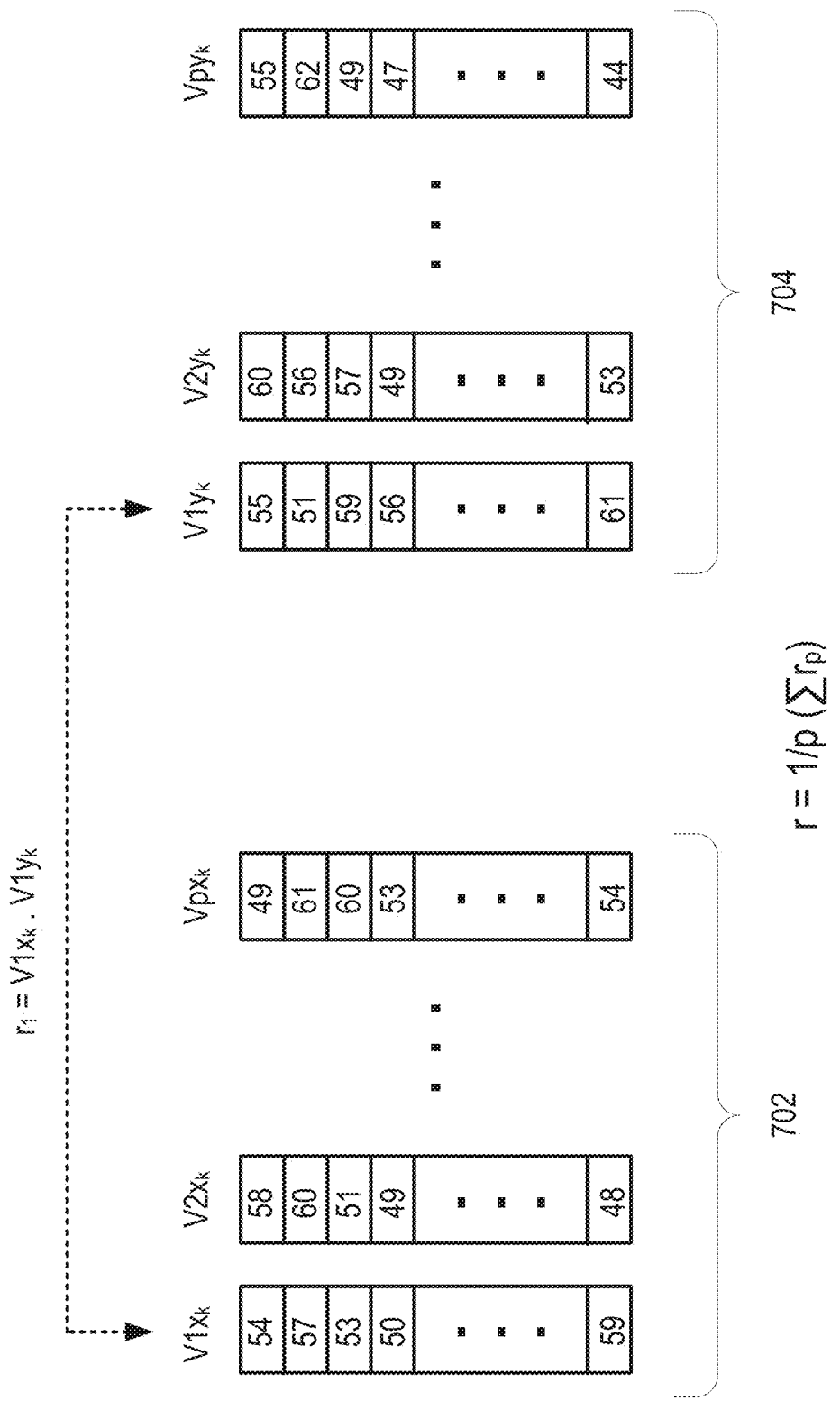
FIG. 7 shows one embodiment of a schematic of a hybrid approach for determining an estimate of an intersection of two sets of user identifiers.

The method 200 can include estimating a size of the intersection of the first set of user identifiers and the second set of user identifiers based on a dot product of the first vector $Vx_k$ and the second vector $Vy_k$, as shown in FIG. 7. In some embodiments, the first data processing system 102 can subtract a value $n_x/k$ from each coordinate value of the first vector $Vx_k$ and a value $n_y/k$ from each coordinate value of the second vector $Vy_k$, where $n_x$ and $n_y$ represent the estimate of the number of user identifiers in the first set of user identifiers 302 and the second set of user identifiers 304, respectively. In some implementations, $n_x$ and $n_y$ are provided by the first and second content delivery platforms respectively. In some embodiments, the first data processing system 102 can estimate the value r of the intersection, i.e., the number of user identifiers common to both the first set of user identifiers 302 and the second set of user identifiers 304 based on the following expression:

$$r = \sum_{i=1}^{k} Vx_i \cdot Vy_i$$

As the determination of the vector is based on the aggregate statistic of all the user identifiers within the corresponding set of user identifiers, the aggregation removes any correlation between the value of the vector and the identity of the user. Therefore, the vectors utilized to determine the estimate of the intersection are privacy safe.

In some embodiments, the data processing system executing method 200 can determine intermediate estimates of intersection based on pairwise dot products of vector of counts generated using the same hash function while executing step 214. Thus for example, the first data processing system 102 can generate a first intermediate vector $r_1$ based on the dot product of $V1x_k$ and $V1y_k$, $r_2$ based on the dot product of $V2x_k$ and $V2y_k$, and so on as show in FIG. 7. The data processing system can generate an estimate of the intersection based on the average of the intermediate estimates of intersections by summing all the intermediate estimates and dividing the sum by p, where p is the number of hash functions transmitted in steps 204 and 206 of method 200. By subtracting the estimate of the intersection value from the sum of the estimates of the total number of user identifiers in each vector, the method 200 can estimate the number of unique user interactions with the set of content items across both content delivery platforms.

In some embodiments, the data processing system executing method 200 can subtract a value $n_x/k$ from each coordinate value of the vectors $V1x_k, V2x_k, \ldots, Vpx_k$, 902 and a value $n_y/k$ from each coordinate value of the second vectors $V1y_k, V2y_k, \ldots, Vpy_k$, 904, where $n_x$ and $n_y$ represent the number of user identifiers in the first set of user identifiers 302 and the second set of user identifiers 304, respectively. The number of user identifiers in the first and second set of user identifiers are estimated in steps 210 and 212 respectively. The first data processing system can subtract these values before carrying out the dot product of the vectors. In some embodiments, the values $n_x$ and $n_y$ can be received by the data processing system executing method 200 when receiving the first and second vector in steps 206 and 208 respectively.

In a non-limiting example embodiment, the code to implement parts of method 200 may look like the following:

```
def ComputeVocIntersetion(voc1, voc2, n1, n2, k):
    """
    Args:
        voc1, voc2: Vectors of counts for sets 1 and 2
        n1, n2: Cardinalities of sets 1 and 2
        k: Size of the vectors of counts
    Returns:
        The cardinality of the intersection of the two sets.
    """
    assert len(voc1) == len(voc2) == k
    return sum((voc[i]-n1/k)*(voc2[i]-n2/k)
        for i in range(k))
```

Figure 3:
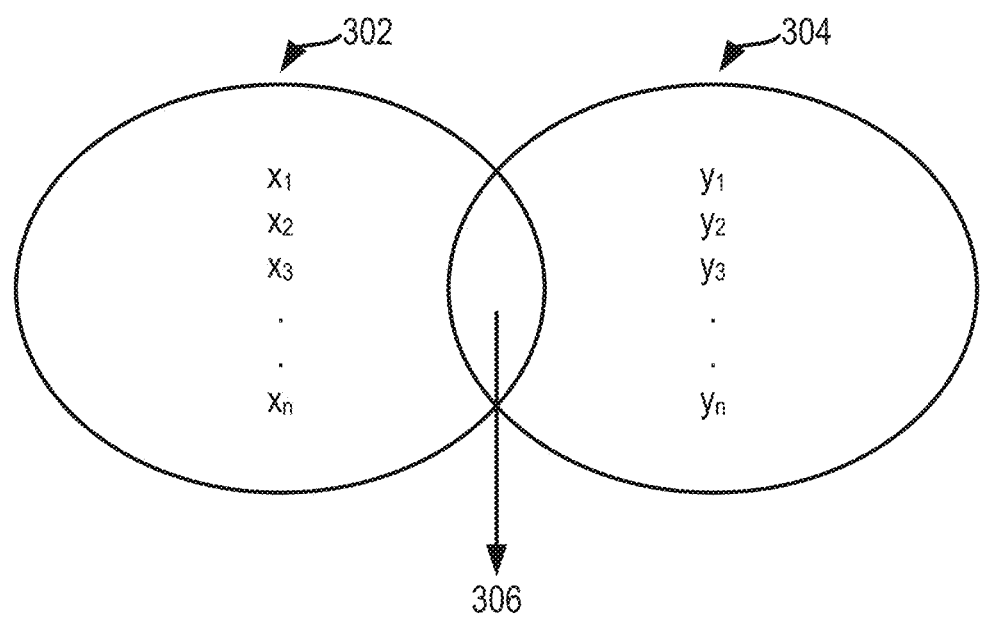
FIG. 3 shows a graphical representation of one embodiment of the intersection of the first set of user identifiers and the second set of user identifiers.

FIG. 3 shows a schematic of two sets of user identifiers and their intersection. In particular, FIG. 3 shows a first set of user identifiers 302 and a second set of user identifiers 304. The first set of user identifiers 302 and the second set of user identifiers 304 may be generated by the second data processing system 104 and the third data processing system 106, respectively. The first set of user identifiers 302 includes a set of n user identifiers $x_1, x_2, x_3, \ldots, x_n$, while the second set of user identifiers 304 includes a set of n user identifiers $y_1, y_2, y_3, \ldots, y_n$. While FIG. 3 shows the first and the second set of user identifiers 302 and 304 having the same number n of user identifiers, it should be understood that the first set of user identifiers 302 can have a different number of user identifiers that that in the second set of user identifiers 304. The first set of user identifiers 302 may include a list of user identifiers associated with users or user devices 108 that interacted with a particular content item or content item campaign, and may have been collected by the second data processing system 104. The first data processing system 104 can store the first set of user identifiers 302 in memory in a data structure such as a one dimensional or multidimensional array. The second set of user identifiers 304 can be similarly managed by the third data processing system 106, for example. A publisher, such as the first data processing system 102 would like to determine the unique set of user identifiers from the first and the second set of user identifiers 302 and 304.

In some implementations, the second and the third data processing systems 104 and 106 could transmit the first and the second set of user identifiers 302 and 304, respectively, to the first data processing system 102 for the determination of a unique and unduplicated set of user identifiers. However, merely transmitting the first and the second set of user identifiers 302 and 304 can expose the identities of the users to the first data processing system, thereby defeating the privacy of the users associated with the user identifiers. For example, the entire history of content item interaction of one or more users may be exposed to the first data processing system 102. In some implementations, cryptographic techniques, such as private set intersection (PSI) can be utilized to allow a third party, such as the first data processing system 102, to determine an intersection of the first and the second set of user identifiers 302 and 304, while maintaining privacy. However, PSI implementations involve substantial communication overhead between the data computing systems, thereby increasing the computation time. In some implementations, cardinality estimators, such as hyperloglog, mentioned above, can be utilized to determine the union of the first and the second sets of user identifiers 302 and 304, where the union can be used to determine the intersection of the two sets. However, hyperloglog is not privacy safe.

Figure 4A:
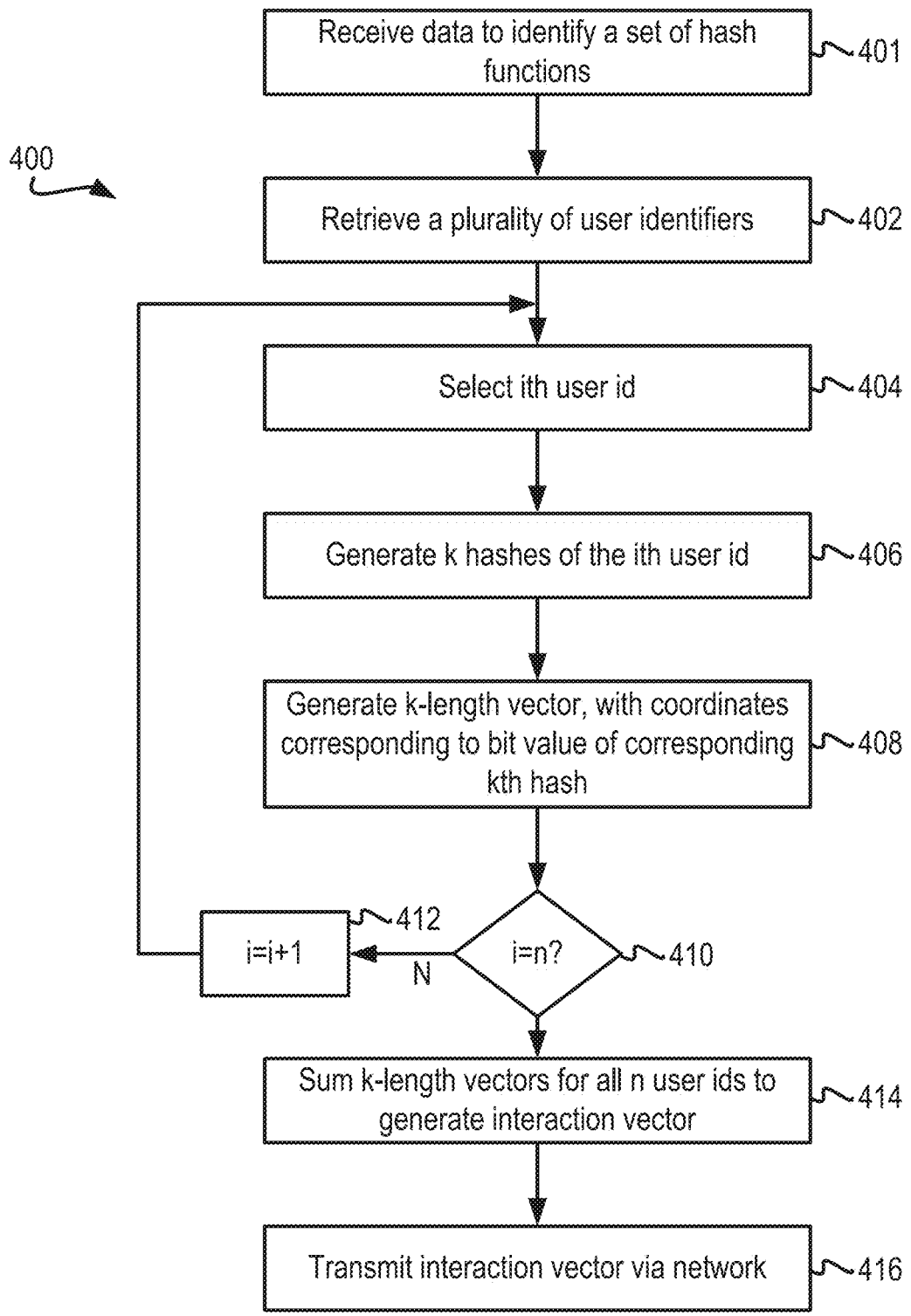
FIG. 4A shows a flow diagram illustrating one embodiment of a method for generating and transmitting an interaction vector representing user interactions with a set of content items based on a multiple hash functions.
Figure 4B:
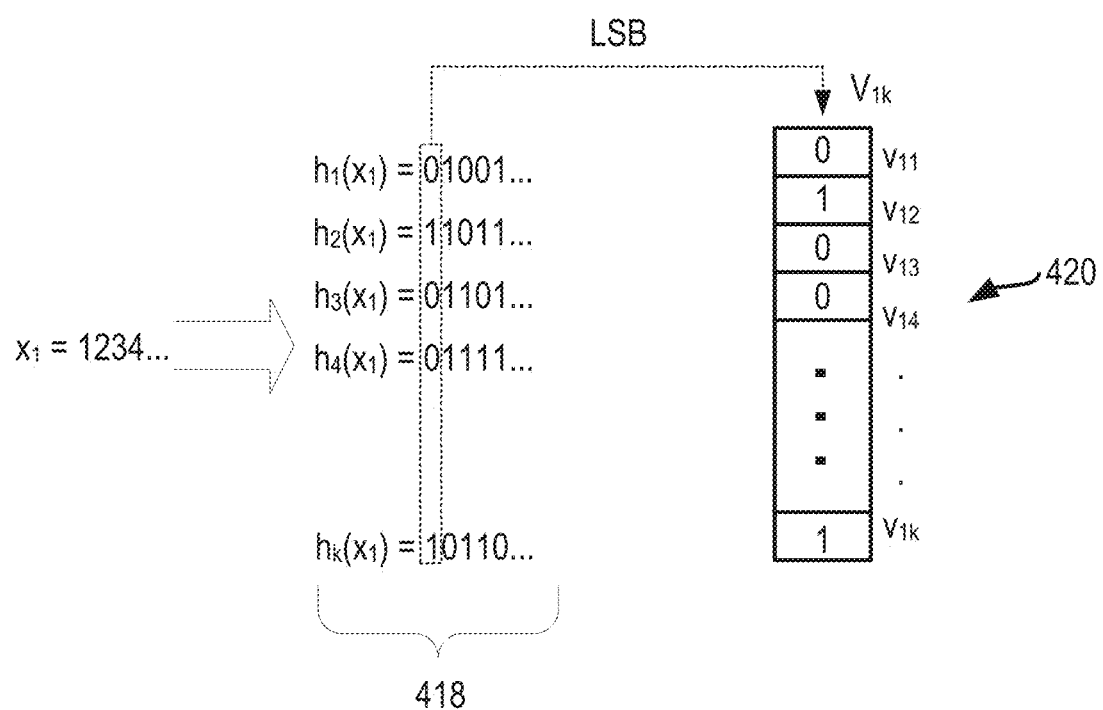
FIG. 4B illustrates one embodiment of generating a k-length vector based on hashes of user interaction data as in the method shown in FIG. 4A.

FIG. 4A shows a flow diagram of method 400, which illustrates an example embodiment of a method to generate a vector representing user interactions with a set of content items. The method 400 can be executed, for example, by the second data processing system 104 or the third data processing system 106. The method 400 can be executed, for example, to generate a user vector 420 as shown in FIG. 4B for each item of a set. For example, the set could be the set of user identifiers 302 or the set of user identifiers 304 as shown in FIG. 3. The method 400 includes receiving data to identify a set of hash functions 401. This step can be executed, for example, by the second data processing system 104 or the third data processing system 106, which can receive the data to identify the set of hash functions from the first data processing system 102 via the network 110. The method 300 includes retrieving a plurality of user identifiers 402. In some implementations, the plurality of user identifiers can be retrieved from storage local to the second data processing system 104 or from storage local to the third data processing system 106. In some implementations, the plurality of user identifiers can be retrieved from a remote storage via the network 110. In some implementations, the plurality of user identifiers can be retrieved from a database or datacenter.

The method 400 includes selecting the ith user identifier 404. This step can be executed, for example, by the second data processing system 104 or the third data processing system 106 to process the set of user identifiers retrieved in step 402. FIG. 4B shows a schematic depicting processing of a portion of the method 400. In particular, FIG. 4B shows selection of the first user identifier $x_1$ (ith, i=1). While FIG. 4B shows the selection of the first user identifier in the first set of user identifiers 302, it should be understood that the user identifiers can be selected in any order.

The method 400 includes generating k hashes of the selected user identifier 406. The second data processing system 104 or the third data processing system 106 can generate k hashes $h_1(x_1), h_2(x_1), h_3(x_1), \ldots, h_k(x_1)$ of the selected user identifier $x_1$, as shown in FIG. 4B. In some embodiments, the second data processing system 104 or the third data processing system 106 can utilize k independent hash functions to generate k hashes of the first user identifier $x_1$. In some embodiments, the k independent hash functions correspond to the data to identify a set of hash functions in step 401. In some embodiments, the second data processing system 104 or the third data processing system 106 can utilize k/b hash functions, where b is a number of bits in the hash digest.

In some embodiments, a salt can be added to each of the selected user identifier to enhance the privacy of the user. The salt can be a randomly generated string of bits that can be concatenated or somehow combined with the data structure containing the selected user identifier. In some embodiments, the salt can be pre-determined. In such embodiments, the salt can be pre-determined by an entity that is connected to system 100 via network 110. In some embodiments, each user identifier selected by method 400 is concatenated with the same salt. In some embodiments, each user identifier selected by method 400 is concatenated with a different salt. In some embodiments, the data processing systems executing method 400, for example, 104 or 106, may concatenate each user identifier with the same salt. In some embodiments, the two data processing systems executing the method 400 may use different salts.

In some embodiments, the salt is received by the data processing system executing method 400 by a third party provider. In some embodiments, before concatenating the salt with each user identifier, the salt is hashed using a pre-determined hash function. In such embodiments, the pre-determined hash function may be determined by the third party providing the salt. In some embodiments, the third party providing the salt may provide a new salt based on a fixed period of time. For example, the third party salt provider may provide a new salt after an hour, two hours, one day, two days, a week, two weeks, a month, two months or a year. In some embodiments, the third party salt provider may sign the salt with a public key belonging to the data processing system executing method 400.

The method 400 includes generating a first k-length vector, where coordinate values of the first k-length vector equal to a bit value of the corresponding kth hash 408. As shown in FIG. 4B, the second data processing system 104 or the third data processing system 106 can generate a first k-length vector 420, where the value of each coordinate of the k-length vector 420 is equal to a bit value of the k hashes 418. In some embodiments, such as the one shown in FIG. 4B, the value of a kth bit of the k-length vector 420 can be equal to the bit value of the least significant bit of the corresponding kth hash of the k hashes 418. In some embodiments, instead of the least significant bit, any other bit position can be utilized. In some embodiments, at least two bits of the k-length vector 418 can correspond to two different bit positions of their respective hash. For example, the bit value of one bit in the k-length vector can be equal to a least significant bit of the corresponding kth hash, while the bit value of another bit in the k-length vector can be equal to the most significant bit of the corresponding kth hash. The bit position of a kth hash assigned to provide the bit value for the kth bit of the k-length vector can be pre-determined. In some embodiments, the bit position of a kth hash assigned to provide the bit value for the kth bit of the k-length vector can be received with the data to identify a set of hash functions in step 401. Whatever the methodology used for selecting the bit values for the k-length vector from the k hashes, it may be ensured that the generation of the k-length vector from the second set of user identifiers 304 follows the same methodology. In some embodiments, the second data processing system 104 or the third data processing system 106 can utilize fewer than k hashes to generate the k-length vector 402. For example, the second data processing system 104 or the third data processing system 106 can set positions 1, 2, . . . , b in the k-length vector based on bits 1, 2, . . . , b of the hash $h_1(x_1)$, positions b+1, b+2, . . . , 2*b based on bits 1, 2, . . . , b of $h_2(x_1)$, and so on (assuming the LSB is at bit position 1). Generally, the second data processing system 104 or the third data processing system 106 can set bit positions $(i-1)*b+1$ to $i*b$ of a k-length vector of a first user identifier $x_1$ based on b bits of the hash $h_i(x_1)$. In instances where k is not divisible by b, then k/b can be rounded up, and any leftover bits can be discarded.

The method 400 includes generating k-length vectors corresponding to all the user identifiers in the plurality of user identifiers retrieved in step 402. For example, the second data processing system 104 or third data processing system 106 can determine whether the currently generated k-length vector is the nth k-length generated vector 410. If no, then the second data processing system 104 or the third data processing system 106 can increment the counter i 312, and select the next user identifier from the plurality of user identifiers retrieved in step 402, and generate a k-length vector as discussed above. In this manner, the second data processing system 104 or the third data processing system 106 can generate n k-length vectors, where each of the n k-length vectors corresponds to a user identifier in the plurality of user identifiers retrieved in step 402.

Figure 6:
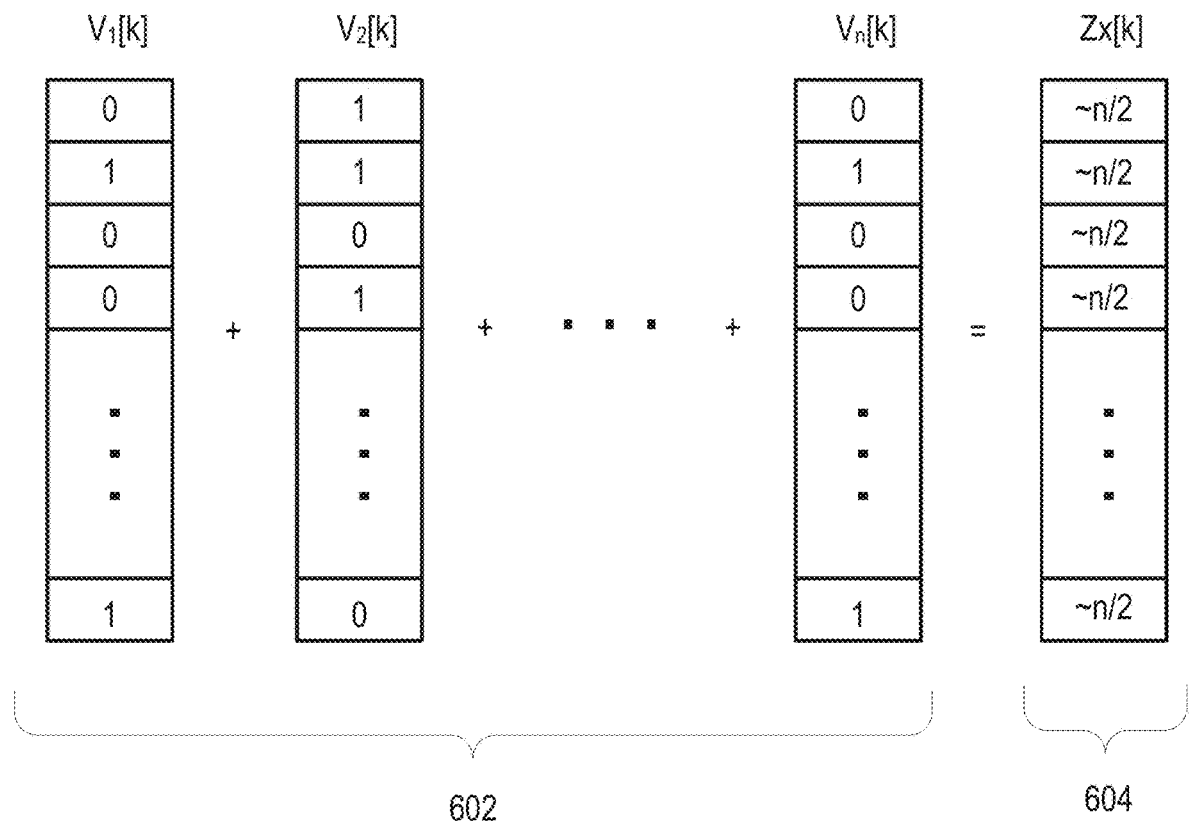
FIG. 6 shows one embodiment of a schematic adding n k-length vectors corresponding to n user identifiers from a set of content items generating an interaction vector as in the method shown in FIG. 4A.

The method 400 includes summing the n k-length vectors to generate an interaction vector 414. This can be called the binomial vector method. The second data processing 104 and the third data processing system 106 can sum the n k-length vectors corresponding to the n user identifiers in the plurality of user identifiers retrieved in step 402. The second data processing system 104 or the third data processing system 106 can perform a numerical addition of the "0"s and the "1"s in a bit position of the n k-length vectors $V_{1k}$ to $V_{nk}$ to generate a k-length first $Zx_k$. In a non-limiting example, if there were 10 k-length vectors where six of the k-length vectors had a "1" in the first bit position and the remaining four of the k-length vectors had a "0" in the first bit position, the k-length first vector $Zx_k$ can have a value 6 in the first position. Typically, for a large number of k-length vectors (i.e., for large values of n), the value at each kth position of the first vector $Zx_k$ would be approximately equal to n/2 as shown in FIG. 6.

The method 400 includes transmitting the interaction vector via a network 416. In some embodiments, the second data processing system 104 or the third data processing system 106 transmits the interaction vector generated in step 414 to the first data processing system 102. In some embodiments, transmitting the interaction vector includes transmitting the vector via an encrypted communication channel, for example HTTPS. In some embodiments, prior to transmitting the interaction vector, n/2 is subtracted from each coordinate in the interaction vector. In some embodiments, the number of user interactions n is transmitted along with the interaction vector. In some embodiments, transmitting the interaction vector includes transmitting a plurality of vectors of counts. In such embodiments, prior to transmitting the plurality of vectors of counts, n/2 is subtracted from each coordinate in each of the plurality of the vectors of counts.

Figure 5A:
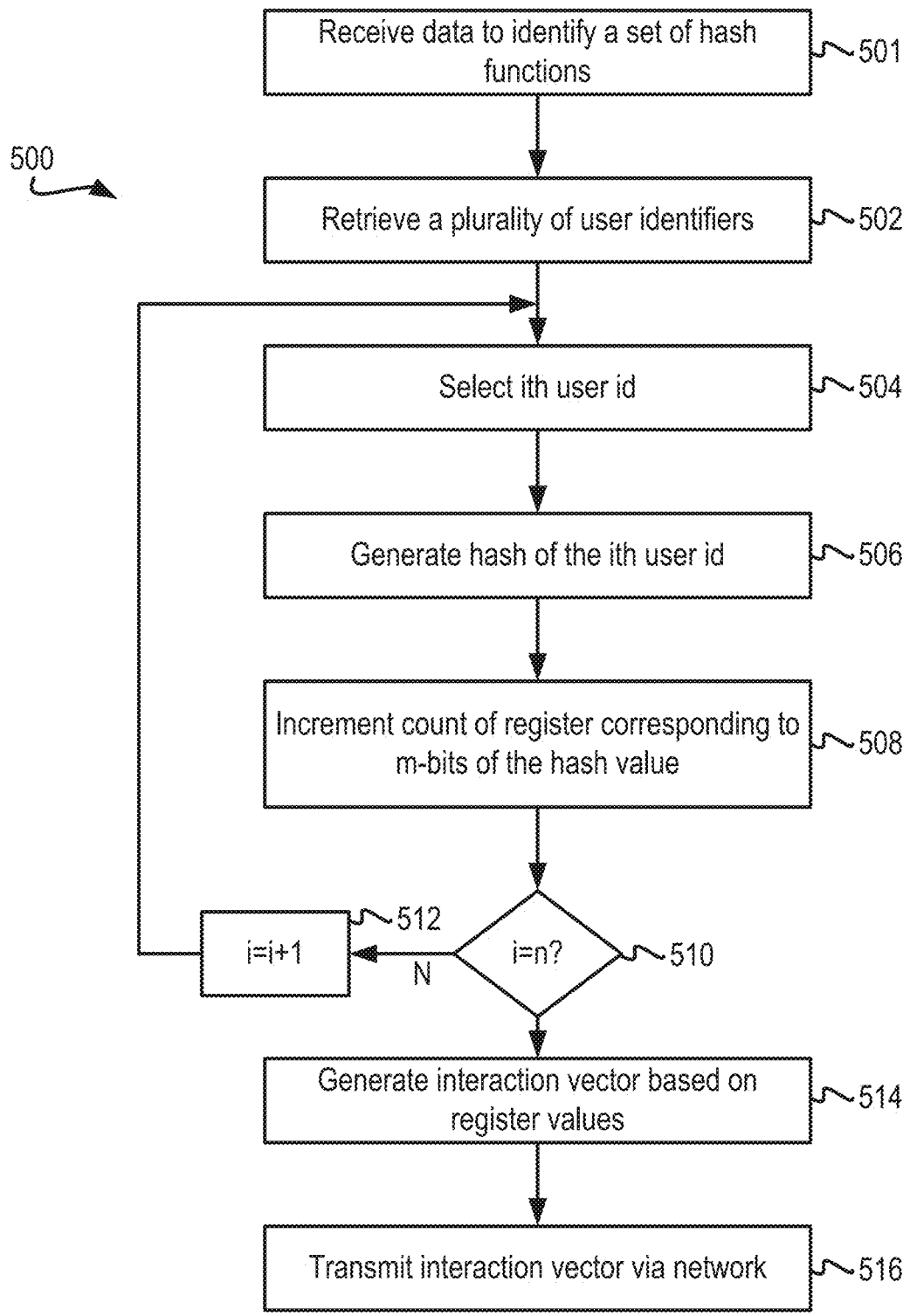
FIG. 5A shows a flow diagram illustrating one embodiment of a method for generating and transmitting an interaction vector representing user interactions with a set of content items based on a single hash function.
Figure 5B:
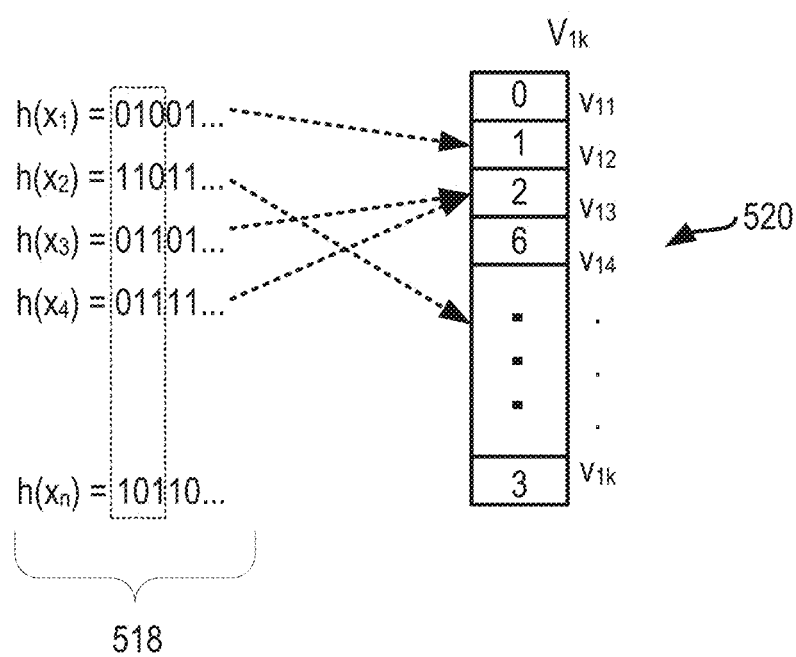
FIG. 5B illustrates one embodiment of generating a k-length vector based on m-bits of a hash of user interaction data, where $k=2^m$ as in the method shown in FIG. 5A.

FIG. 5A shows a flow diagram of method 500, which illustrates an example embodiment of a method to generate a vector representing user interactions with a set of content items. The vector of counts method 500 can be executed, for example, by the second data processing system 104 or the third data processing system 106. The method 500 can be executed, for example, to generate a user vector 520 as shown in FIG. 5B for each item of a set. For example, the set could be the set of user identifiers 302 or the set of user identifiers 304 as shown in FIG. 3. In some embodiments, receiving data to identify a set of hash functions can include receiving a set of hash functions containing a single hash function. In some embodiments, the data to identify a set of hash functions may be a binary file containing executable computer instructions that generate a hash based on an input value. The method 500 includes retrieving a plurality of user identifiers 502. In some implementations, the plurality of user identifiers can be retrieved from storage local to the second data processing system 104 or from storage local to the third data processing system 106. In some implementations, the plurality of user identifiers can be retrieved from a remote storage via the network 110. In some implementations, the plurality of user identifiers can be retrieved from a database or datacenter.

The method 500 includes selecting the ith user identifier 504. This step can be executed, for example, by the second data processing system 104 or the third data processing system 106 to process the first set of user identifiers 302 or the second set of user identifiers 304. FIG. 5B shows a schematic depicting processing of a portion of the method 500. In particular, FIG. 5B shows a selection of the first user identifier $x_1$ (ith, i=1) by the second data processing system 104 or the third data processing system 106. While FIG. 5B shows the selection of the first identifier in the first set of user identifiers 302, it should be understood that the user identifiers can be selected in any order, and the user identifiers are the same user identifiers retrieved in step 502.

The method 500 includes generating a hash of the selected user identifier 506. The second data processing system 104 or the third data processing system 106 can generate a hash using a hash function. In some embodiments, the hash function is based on the data identifying a set of hash functions in step 501. In some embodiments, if there is more than one hash function in the set of hash functions received in step 501, the method may choose one of the hash functions in the set of hash functions to perform the hash computation. In a non-limiting example, the method may choose the first hash function in the set of hash functions. For example, as shown in FIG. 5B, the second data processing system 104 or the third data processing system 106 generates a hash $h(x_1)$ based on the hash function h( ). In some embodiments, the second data processing system 104 or the third data processing system 106 can utilize well known hash functions such as SHA(1, 2, or 3), MD5, etc.

In some embodiments, a salt can be added to each of the selected user identifier to enhance the privacy of the user. In some embodiments, the salt is a randomly generated string of bits that is concatenated with the data structure containing the selected user identifier. In some embodiments, the salt can be pre-determined. In some embodiments, the salt can be pre-determined by a third party that is connected to system 100 via network 110. In some embodiments, each user identifier selected by method 500 is concatenated with the same salt. In some embodiments, each user identifier selected by method 500 is concatenated with a different salt. In some embodiments, the data processing systems executing method 500, for example, 104 or 106, may concatenate each user identifier with the same salt. In some embodiments, the two data processing systems executing the method 400 may use different salts.

In some embodiments, the salt is received by the data processing system executing method 500 by a third party provider. In some embodiments, before concatenating the salt with each user identifier, the salt is hashed using a pre-determined hash function. In such embodiments, the pre-determined hash function may be determined by the third party providing the salt. In some embodiments, the third party providing the salt may provide a new salt based on a fixed period of time. For example, the third party salt provider may provide a new salt after an hour, two hours, one day, two days, a week, two weeks, a month, two months or a year. In some embodiments, the third party salt provider may sign the salt with a public key belonging to the data processing system executing method 500.

The method 500 includes incrementing the count of a register corresponding to m-bits of the hash value 508. The second data processing system 104 or the third data processing system 106 can select a set of bits of the hash value to determine the appropriate register to increment. For example, as shown in FIG. 5B, the second data processing system 104 or the third data processing system 106 can select the first 3 bits of the hash values to determine the register. Although, in some other embodiments, the second data processing system 104 or the third data processing system 106 can select any other set of bit of the hash value to determine the register value. As the first three bits of the hash of the first user identifier $x_1$ is "010", the data processing system executing the method can increment the second register in the set of registers 520. The total number of registers k in the set of registers 520 can be equal to 2^m, where m represents the number of bits of the hash value that the data processing system executing the method utilizes to select the register. In some embodiments, the number of registers k can be independent of the number of bits m of the hash value that the data processing system executing the method utilizes to select the register. For example, the second data processing system 104 or the third data processing system 106 can select a particular value k and map the m bits appropriately to the k registers. The set of registers 520 can represent coordinates of an interaction vector $Vx_k$.

The method 500 includes generating hashes and incrementing counts or registers for all user identifiers in the first set of user identifiers. This is called the vector of counts method. For example, the second data processing system 104 or the third data processing system 106 can determine whether the currently generated hash value is for the nth user identifier 510. If no, the data processing system executing the method can increment a counter i 512, and select the next user identifier from the plurality of user identifiers retrieved in step 502. For example, referring to FIG. 5B, the data processing system executing the method can increment the third register based on the first three bits of the hash value for the third user identifier $x_3$, and increment the sixth register based on the first three bits of the hash value of the second user identifier $x_2$. In this manner, the data processing system executing the method can increment the count in each register of the set of registers 520. The data processing system executing the method can store the set of registers 520 in a data structure in memory. For example, the data structure can be a one dimensional array or a multi-dimensional array. In some embodiments, the set of registers 520 can be stored as a vector representing user interactions. In some embodiments, the data structure containing the set of registers 520 can be changed into a vector representation, wherein each coordinate of the vector is equal to one of the set of registers 520.

In some embodiments, the method 500 may add noise to one or more of the registers in register set 520. In some embodiments, the method 500 may add noise to one or more coordinates of the vector representation based off of register set 520. In these embodiments, the method 500 may add Laplacian noise to one or more of the registers in register set 520. In some embodiments, the method 500 may add Laplacian noise to all of the registers in register set 520. In some embodiments, the method 500 may add a vector of Laplacian noise to the interaction vector based on the set of registers 520. In these embodiments, the vector of Laplacian noise may have the same cardinality as the interaction vector based on the set of registers 520. In certain embodiments, the method 500 may subtract the expected value of each of the registers from the contents of each register. In such embodiments, the expected value of each register could be equal to total count of the register set 520 divided by the number of registers in register set 520, designated in FIG. 5B as k.

In a non-limiting example embodiment, the code to implement parts of method 500 may look like the following:

```
def ComputeVectorOfCounts(k, b, user_set):
    """
    Args:
        k: Size of the vector to be returned
        b: Scale factor of the Laplacian noise.
        user_set: Deduplicated set of user IDs.
    Returns:
        The vector of counts of size k for the given user
        set, with Laplacian noise of scale b added.
    """
    hashed_user_set = get_hashed_user_set(user_set)
    user_buckets = [get_last_k_digits(id, k)
        for id in hashed_user_set]
    voc = [ ]
    for i in range(k):
        voc.append(user_buckets.count(i) +
            generate_laplace_noise(b))
    return voc
```

Figure 9:
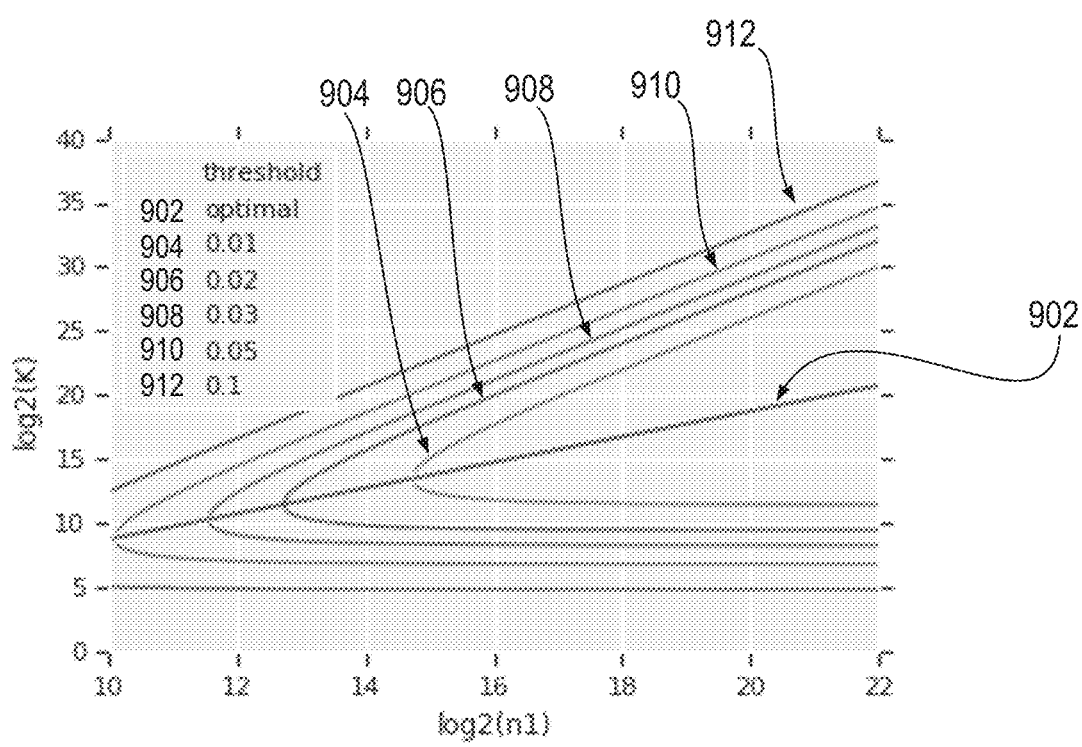
FIG. 9 shows experimental data from a non-limiting embodiment of an architecture implemented to test the accuracy of union cardinality estimations while varying vector size and set cardinality.

In some embodiments, the method 500 may use a hybrid approach to generate a plurality of interaction vectors. In particular, in the hybrid approach, the data processing system executing the method 500 can generate a vector of counts using not just one hash function, as in the vector of counts approach, but generating p vectors of counts using p hash functions. In some embodiments, the plurality of hash functions are identified by the data received in step 501. FIG. 9 shows p vectors of counts $V1x_k$, $V2x_k$, ..., $Vpx_k$, 902 generated by the second data processing system 104 or the third data processing system 106 executing a based the set of user identifiers retrieved in step 502, for example the first set of user identifiers 302 or the second set of user identifiers 304. Each vector of count $Vpx_k$ can be generated based on an independent hash function. Thus, the first vector of count $V1x_k$ can be generated using a first hash function, and the second vector of counts $V2x_k$ can be generated using a second independent hash function, and so on. Thus, the data processing system executing method 500 generates hashes of all the user identities in the set of user identities retrieved in step 502 using a first hash function to generate the vector of counts $V1x_k$ in a manner similar to that discussed above in relation to FIGS. 5A and 5B.

The method 500 includes generating a k-length interaction vector based on the register values 514. As mentioned above, the value of the counts of the registers 520 can represent the coordinates of a k-length vector $Vx_k$. The method 500 includes transmitting the interaction vector via a network 516. In some embodiments, the second data processing system 104 or the third data processing system 106 transmits the interaction vector generated in step 514 to the first data processing system 102. In some embodiments, transmitting the interaction vector includes transmitting the vector via an encrypted communication channel, for example HTTPS. In some embodiments, the number of user interactions n is transmitted along with the interaction vector. In some embodiments, transmitting the interaction vector includes transmitting a plurality of vectors of counts. In some embodiments, prior to transmitting the interaction vector, n/k is subtracted from each coordinate in the interaction vector.

FIG. 6 shows a schematic of a binomial vector of counts approach for generating an interaction vector from k hash functions and n user identifiers. In some embodiments, the process outlined in the schematic can be performed by a data processing system executing method 400. Each of the vectors 602 representing hashed user interaction information can have a cardinality k, representing k hash functions. Each of the vectors 602 can represent a single user identifier in the set of user identifiers. The vectors 602 can be summed together, for example in method 400, to generate an interaction 604 vector with cardinality k. In some embodiments, the each coordinate of the interaction vector 604 can be about equal to n/2, where n is the number of user identifiers.

FIG. 7 shows a schematic of a hybrid approach for determining an estimate of an intersection of two sets of user identifiers, which in some embodiments is performed by a data processing system executing step 214 of method 200. The hybrid approach combines the features of the binomial vector approach and the vector of counts approach discussed above. In particular, in the hybrid approach, the data processing system executing method 200 can generate a vector of counts using not just one hash function, as in the vector of counts approach, but generating p vectors of counts using p hash functions.

In some embodiments, the system 100 can apply additional techniques to improve the privacy of the approaches discussed above. For example, in some embodiments, the second data processing system 104 and the third data processing system 106 can add noise to the counts when generating vector of counts discussed above in relation to FIGS. 5-7. Adding noise to the vector of counts can include adding random numbers to each element of the vectors of counts. The second data processing system 104 and the third data processing system 106 can each add noise to their respective vectors of counts prior to sending the vectors of counts to the first data processing system 102, which determines an estimate of the intersection. In some embodiments, the second data processing system 104 and the third data processing system 106 can add various types of noise, such as, for example, Gaussian noise, geometric noise, etc., into the vector generated by the binomial vectors approach. In some embodiments, the second data processing system 104 and the third data processing system 106 can add, for example, Laplacian noise to the vectors generated by the vector of counts approach. The addition of noise to the vectors, whether generated by the binomial vector or the vector of counts approach, can improve differential privacy of the user identifiers. The differential privacy of the binomial vectors approach and the vectors of counts approach discussed above can be achieved while sacrificing less accuracy that that by previously existing differentially private cardinality estimators.

In yet another approach, the user identifiers can be encrypted or hashed prior to generating the vectors discussed above in relation to FIGS. 3-4B. For example, the second data processing system 104 and the third data processing system 106 can encrypt or compute a hash of each of the user identities in the first set of user identities 302 and the second set of user identities 304. The second data processing system 104 and the third data processing system 106 can then generate the vectors (the binomial vectors or the vectors of counts) based on the encrypted set of user identities. Encrypting the user identifiers before generating the vectors can improve the privacy of the user identities. In some instances, where vectors are formed from the same user identities, the intersection of the vectors may still include some information related to the user identities. By encrypting or hashing the user identities prior to generating the vectors, the risk of leakage of information can be reduced.

In some embodiments, the counts in a vector of counts can be permuted prior to communicating the vectors to the first data processing system 102. For example, the second data processing system 104 can permute or re-order the counts in the vectors $Vx_k$ or $V1x_k$ prior to communicating the vectors to the first data processing system 102. The third data processing system 106 may also similarly permute its respective vectors of counts prior to sending the vectors to the first data processing system. Both the first and the second data processing systems 104 and 106 can agree on a permutation scheme and keep the permutation secret. In some embodiments, the first data processing system 102 can select and transmit the desired permutation scheme to the second and the third data processing systems 104 and 106, such that both the systems utilize matching permutation schemes. Permuting the vectors in the vectors of counts can improve the privacy of the user identities in instances where vectors are formed from the same user identities, and the intersection of the vectors may still include some information related to the user identities.

Figure 8:
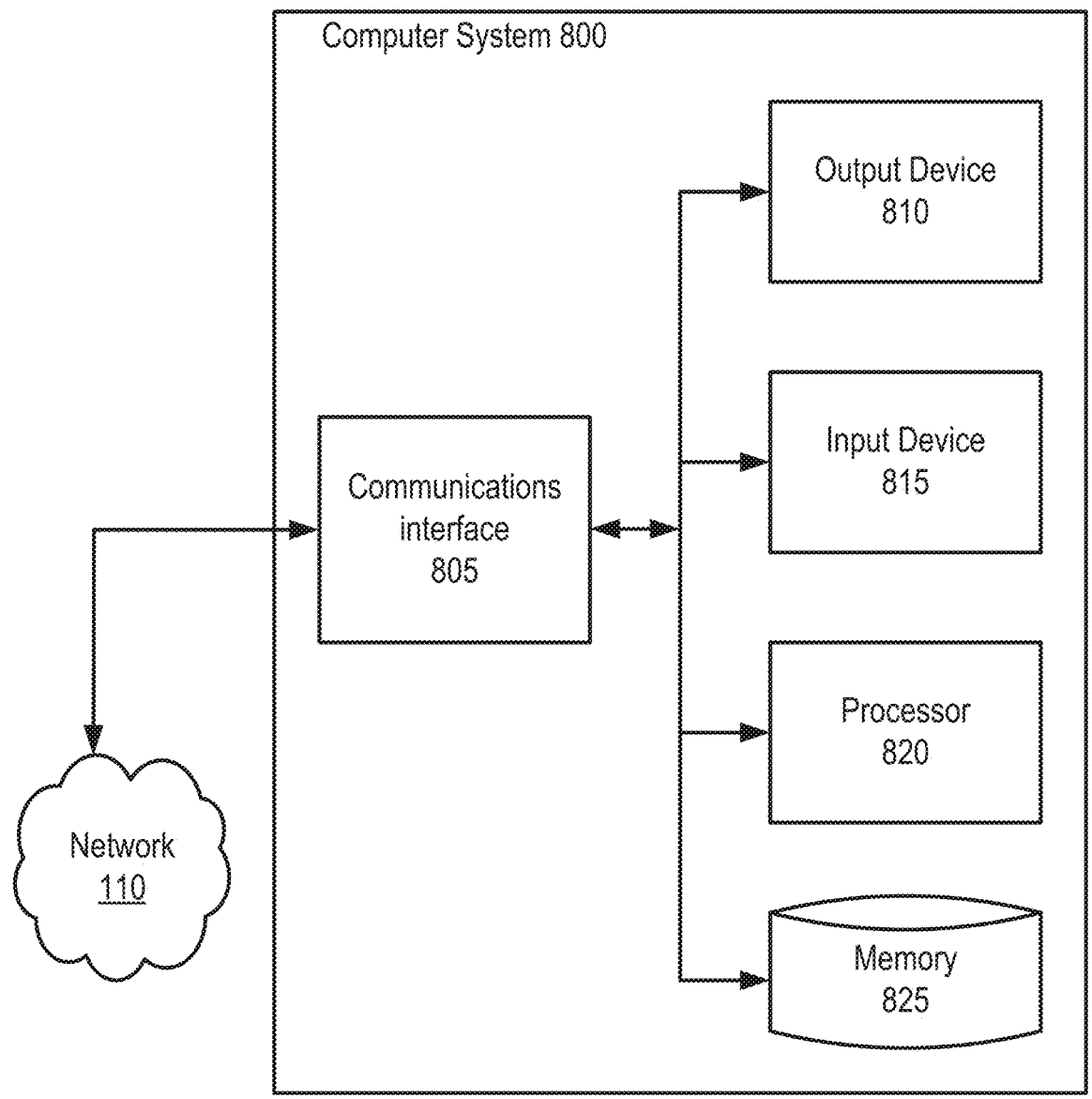
FIG. 8 shows the general architecture of an illustrative computer system that may be employed to implement any of the computer systems discussed herein.

FIG. 8 shows the general architecture of an illustrative computer system 800 that may be employed to implement any of the computer systems discussed herein (including the system 100 and its components such as the first data processing system 102, the second data processing system 104, the third data processing system 106 and the user devices 108 in accordance with some implementations. The computer system 800 can be used to provide information via the network 110 for display. The computer system 800 of FIG. 8 comprises one or more processors 820 communicatively coupled to memory 825, one or more communications interfaces 805, and one or more output devices 810 (e.g., one or more display units) and one or more input devices 815. The processors 820 can be included in the data processing system 100 or the other components of the system 100 such as the first data processing system 102, the second data processing system 104, the third data processing system 106 and the user devices 108.

In the computer system 800 of FIG. 8, the memory 825 may comprise any computer-readable storage media, and may store computer instructions such as processor-executable instructions for implementing the various functionalities described herein for respective systems, as well as any data relating thereto, generated thereby, or received via the communications interface(s) or input device(s) (if present). Referring again to the system 100 of FIG. 1, the data processing systems can include the memory 825 to store information related to the sets of user identifiers, the generated vectors, among others. The processor(s) 820 shown in FIG. 8 may be used to execute instructions stored in the memory 825 and, in so doing, also may read from or write to the memory various information processed and or generated pursuant to execution of the instructions.

The processor 820 of the computer system 800 shown in FIG. 8 also may be communicatively coupled to or control the communications interface(s) 805 to transmit or receive various information pursuant to execution of instructions. For example, the communications interface(s) 805 may be coupled to a wired or wireless network, bus, or other communication means and may therefore allow the computer system 800 to transmit information to or receive information from other devices (e.g., other computer systems). While not shown explicitly in the system of FIG. 8, one or more communications interfaces facilitate information flow between the components of the system 800. In some implementations, the communications interface(s) may be configured (e.g., via various hardware components or software components) to provide a website as an access portal to at least some aspects of the computer system 800. Examples of communications interfaces 805 include user interfaces (e.g., web pages), through which the user can communicate with the data processing system 800.

The output devices 810 of the computer system 800 shown in FIG. 8 may be provided, for example, to allow various information to be viewed or otherwise perceived in connection with execution of the instructions. The input device(s) 815 may be provided, for example, to allow a user to make manual adjustments, make selections, enter data, or interact in any of a variety of manners with the processor during execution of the instructions. Additional information relating to a general computer system architecture that may be employed for various systems discussed herein is provided further herein.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more components of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The features disclosed herein may be implemented on a smart television module (or connected television module, hybrid television module, etc.), which may include a processing module configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

The operations described in this specification can be implemented as operations performed by a data processing apparatus on data stored on one or more computer-readable storage devices or received from other sources.

The terms "data processing apparatus", "data processing system", "user device" or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as the data processing systems 102, 104, 106, and 108 can include clients and servers. For example, the data processing systems 102, 104, 106, and 108 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the data processing systems 102, 104, and/or 106 could be a single module, a logic device having one or more processing modules, one or more servers, or part of a search engine.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided herein relate to controlling the display of content of information resources, the systems and methods described herein can include applied to other environments. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

In further detail and as an example, results from comparison between different architectures and model parameters can be described herein. The results described herein are not meant to limit the scope of the invention. All the architectures implemented herein can be comprised of the elements that make up system 100. In the non-limiting example embodiments described herein, the data processing system 102 is responsible for estimating the union between the two sets of user data 302 and 304. The data processing system 104 is responsible for generating the first interaction vector using, for example, the method 500 and set 302. The data processing system 106 is responsible for generating the second interaction vector using, for example, the method 500 and set 304. In this example embodiment, the data processing systems 102, 104, and 106 can communicate over network 110. The non-limiting example embodiments described herein use the vector of counts approach.

In an exemplary embodiment, the accuracy for estimating the size of the union of two sets of user identifiers, for example 302 and 304, could depend on set cardinalities and the magnitude of their intersection. In some exemplary embodiments, the accuracy for estimating the size of the union of two sets of user identifiers could depend on the size of the interaction vector generated, for example, in method 400 or method 500. In some exemplary embodiments, the accuracy for estimating the size of the union of two sets of user identifiers could depend on the scale of the noise that is added to the interaction vectors.

In a non-limiting exemplary embodiment for implementing and testing various architectures, which does not limit the scope of the invention, the accuracy of the implementation is tested while varying the interaction vector cardinality and the size of the sets user identifiers 302 and 304. The data from this example experiment is illustrated in FIG. 9. In this non-limiting exemplary embodiment, the size of the intersection 306 of the two sets is was one-tenth the size of the first set of user identifiers 302. Both sets of user identifiers are assumed to have the same cardinality. The scale of the Laplacian noise applied in this exemplary embodiment is fixed at $\varepsilon=\ln(3)$, where the scale of the Laplacian noise is equal to $b=1/\varepsilon$. FIG. 9 shows a graph containing contour curves of constant fractional standard error of the estimate of the union cardinality (306) of both sets of user identifiers 302 and 304. As illustrated in FIG. 9, the contour 912 has 10% standard error, the contour 910 has a 5% standard error, the contour 908 has a 3% standard error, the contour 906 has a 2% standard error, and the contour 904 has a 1% standard error. The contours in FIG. 9 indicate this exemplary embodiment with a set cardinality $N_1=N_2=2^{16}$, can achieve a 1% accuracy on an estimate of the union for vector sizes (k) between $2^{13}$ and $2^{17}$.

The plot included in FIG. 9 shows that the non-limiting exemplary embodiment can ensure accuracies on the order of 1-5% with the correct choice of vector size k. The plot in FIG. 9 also shows that the accuracy contours are relatively flat in vector size k with varying set size $N_1=N_2$. Based on this data, one can assume that a minimum vector size of $k=2^{10}=1024$ might ensure a 2% error threshold.

Figure 10:
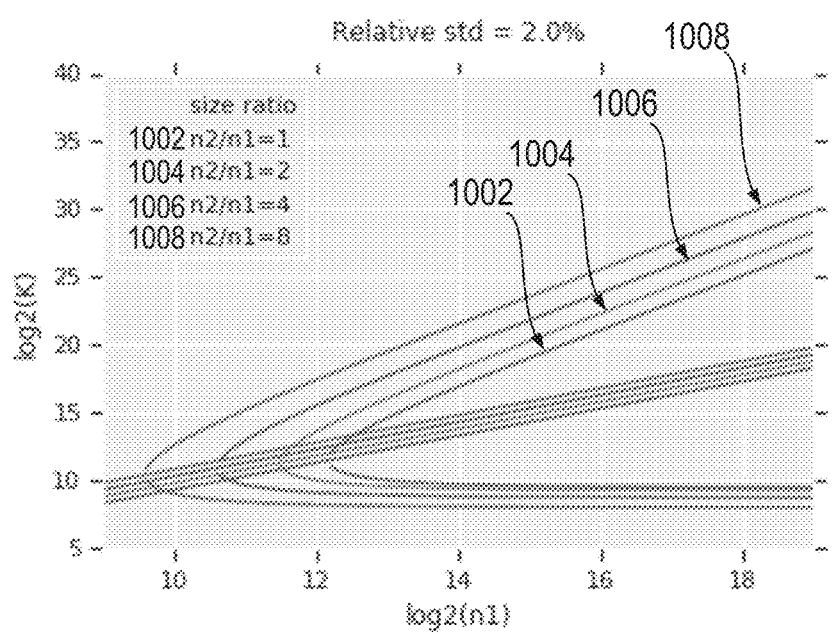
FIG. 10 shows experimental data from a non-limiting embodiment of an architecture implemented to test the accuracy of union cardinality estimations while increasing the cardinality of one of the sets relative to the other.

In another non-limiting exemplary embodiment, which does not limit the scope of the invention, the accuracy of the implementation is tested while varying the set cardinality ratio of $N_1$ (302) and $N_2$ (304). In this non-limiting example embodiment, all other parameters are fixed to the values in the previous experiment. FIG. 10 shows a plot of data obtained from this non-limiting exemplary embodiment. The contours 1002, 1004, 1006 and 1008 each show a 2% error on the union cardinality estimate of the two sets while increasing the cardinality of one of the sets relative to the other. As illustrated in FIG. 10, the contour 1002 shows the threshold of 2% standard error when both sets are of equal size. The contour 1004 shows the threshold of 2% standard error when set $N_2$ (304) is twice as large as set $N_1$ (302). The contour 1006 shows the threshold of 2% standard error when set $N_2$ (304) is four times as large as set $N_1$ (302). The contour 1008 shows the threshold of 2% standard error when set $N_2$ (304) is eight times as large as set $N_1$ (302).

As demonstrated by the plot included in FIG. 10, this non-limiting example embodiment shows that as the cardinality of the two sets (302 and 304) become more unequal, it becomes considerably easier to keep a fixed standard error. This is because, in this non-limiting example embodiment, the absolute error is a function of the intersection size, and the standard error is relative to the union size. Further discussing the results obtained from this embodiment, as the difference in set cardinality increases, the intersection size relative to the union size decreases, because the intersection size is limited by the size of the smaller set.

Figure 11:
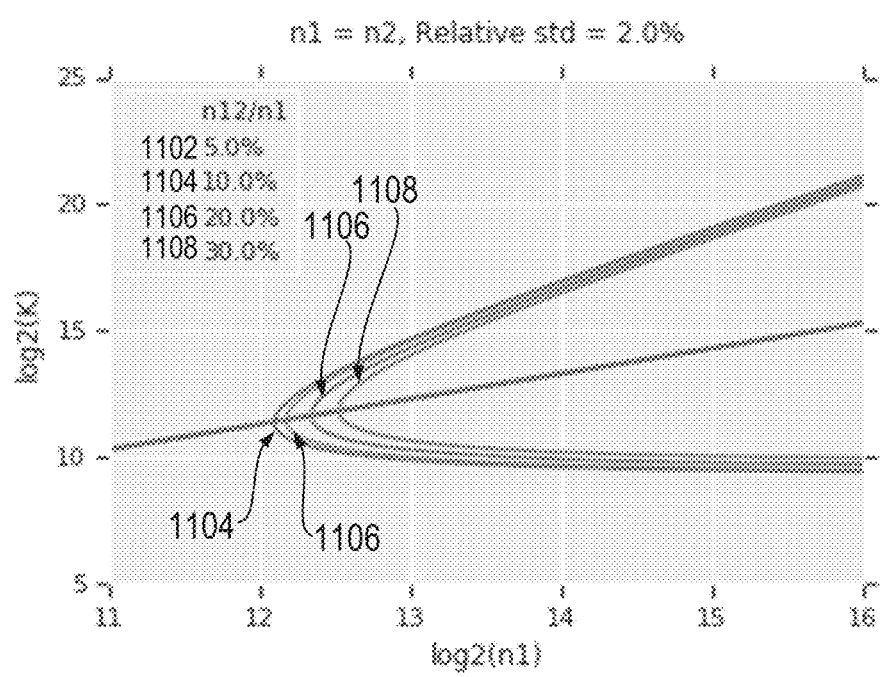
FIG. 11 shows experimental data from a non-limiting embodiment of an architecture implemented to test the accuracy of union cardinality estimations while varying the size of the intersection of both sets.

In another non-limiting exemplary embodiment, which does not limit the scope of the invention, the accuracy of the implementation is tested while varying the fraction of users that are shared (306) by $N_1$ (302) and $N_2$ (304). In this non-limiting example embodiment, both sets $N_1$ (302) and $N_2$ (304) are assumed to have the same cardinality ($N_1=N_2$). The scale of the Laplacian noise applied in this exemplary embodiment is fixed at $\varepsilon=\ln(3)$, where the scale of the Laplacian noise is equal to $b=1/\varepsilon$. FIG. 11 shows a data plot obtained from the experiment implemented using this example embodiment. The contours 1102, 1104, 1106, and 1108 shown in the plot in FIG. 11 show a constant standard error of 2% for different intersection sizes 306. The contour 1102 shows the threshold of 2% constant error when the overlapping region $N_{12}$ (306) is 5% of the size of the first set of user identifiers $N_1$ (302). The contour 1104 shows the threshold of 2% constant error when the overlapping region $N_{12}$ (306) is 10% of the size of the first set of user identifiers $N_1$ (302). The contour 1106 shows the threshold of 2% constant error when the overlapping region $N_{12}$ (306) is 20% of the size of the first set of user identifiers $N_1$ (302). The contour 1108 shows the threshold of 2% constant error when the overlapping region $N_{12}$ (306) is 30% of the size of the first set of user identifiers $N_1$ (302).

The data from this non-limiting example embodiment illustrated in FIG. 11 shows that increasing the intersection size between sets $N_1$ (302) and $N_2$ (304) increases the error for the same size $N_1$ (302) and interaction vector size k. The data illustrated in FIG. 11 also shows that the optimal vector size is almost invariant under increasing the intersection fraction (306). This means, with respect to this example embodiment, that each data processing system 104 and 106 can choose the optimal values of k for their value of N without impacting the accuracy of the estimation in a significant way.

Figure 12:
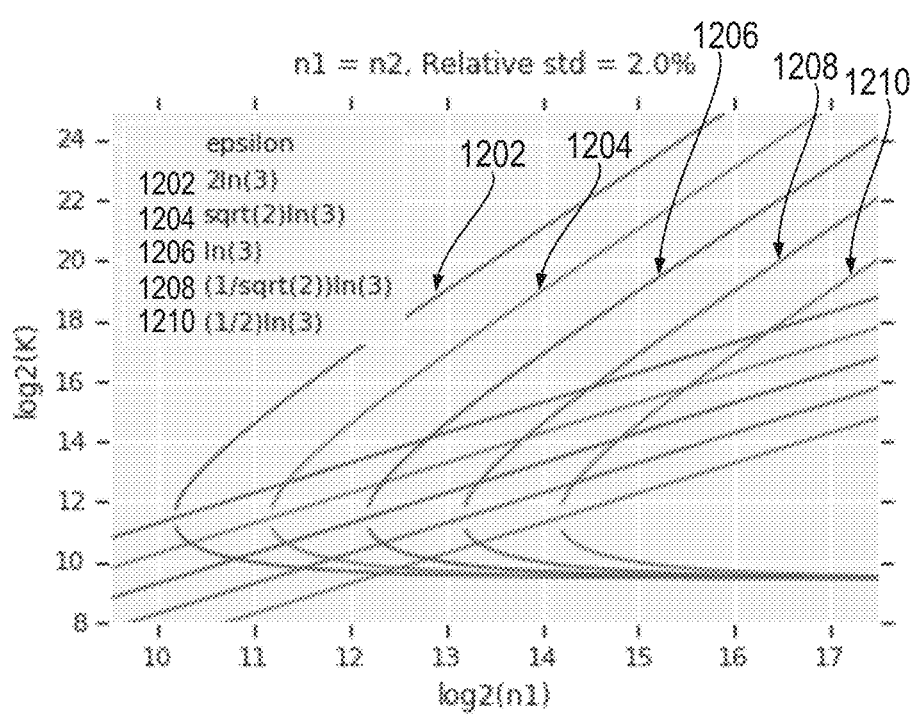
FIG. 12 shows experimental data from a non-limiting embodiment of an architecture implemented to test the accuracy of union cardinality estimations while varying the scale of Laplacian noise added to the vectors.

In another non-limiting exemplary embodiment for implementing and testing various architectures, which does not limit the scope of the invention, the accuracy of the implementation is tested while varying scale of the Laplacian noise ($b=1/\varepsilon$). In the example embodiment described herein, both user identifier sets $N_1$ (302) and $N_2$ (304) have the same cardinality ($N_1=N_2$). The intersection of both sets (306) is fixed at one tenth of the size of $N_1$. FIG. 12 shows a data plot obtained from the experiment implemented using this example embodiment. The contours 1102, 1104, 1106, and 1108 shown in the plot in FIG. 11 show a constant standard error of 2% for different values of $\varepsilon$. The contour 1202 shows the threshold of 2% constant error when $\varepsilon=2\ln(3)$. The contour 1204 shows the threshold of 2% constant error when $\varepsilon=\sqrt{2}\ln(3)$. The contour 1206 shows the threshold of 2% constant error when $\varepsilon=\ln(3)$. The contour 1208 shows the threshold of 2% constant error when $\varepsilon=(1/\sqrt{2})\ln(3)$. The contour 1210 shows the threshold of 2% constant error when $\varepsilon=(1/2)\ln(3)$.

The data from this non-limiting example embodiment illustrated in FIG. 12 shows that the lower bound on vector size k to ensure accuracy has almost no dependence on noise scale. This means, with respect to this example embodiment, that the data processing systems 104 and 106 can choose the lower bound of the vector size k without regard to their chosen noise scale. The data in FIG. 12 also indicates that the optimal vector size k decreases significantly with increasing error scale.

The invention claimed is:

1. A method for providing anonymous data about user interactions with a set of content items, the method comprising:
receiving, based on a request from a requesting party, a set of hash functions;
retrieving a plurality of user identifiers, each of the user identifiers identifying one or more interactions with the set of content items by a respective user identifier of the plurality of user identifiers;
generating a user vector for each respective user identifier of the plurality of user identifiers by:
generating a first hash value of a respective user identifier using a first hash function of the set of k hash functions included in the request from the requesting party;
generating a second hash value of the respective user identifier using a second hash function of the set of k hash functions included in the request from the requesting party;
generating a user vector, comprising k coordinates, wherein a first coordinate of the user vector comprises a subset of bits of the first hash value and a second coordinate of the user vector comprises a subset of bits of the second hash value, wherein each coordinate of the user vector contains no specific information about individual user identifiers or specific interactions of the user identifier with a content item of the set of content items;
generating an interaction vector by summing the plurality of generated user vectors generated for each respective user identifier; and
transmitting, the generated interaction vector to the requesting party, wherein the generated interaction vector provides anonymous data about a plurality of user interactions with the set of content items from a plurality of content delivery platform without revealing the user identifier to the requesting party, wherein the generated interaction vector is used to estimate a number of unique user interactions with the set of content items based on the generated interaction vector and a second interaction vector associated with a third-party.

2. The method of claim 1, wherein receiving, via a network, data to identify the set of hash functions includes receiving data to identify the set of content items.

3. The method of claim 2, wherein retrieving a plurality of user identifiers, each of the user identifiers identifying interactions with the set of content items by a respective user of the plurality includes only retrieving the plurality of user identifiers that identify interaction with the set of content items identified by the received data.

4. The method of claim 1, comprising:
generating p hash values for each of the plurality of the user identifiers, wherein the p hash values correspond to a respective hash function in the set of hash functions,
determining a value of m-bits for each of the p hash values, and
incrementing a count of a register corresponding to the hash value, the register being one of k registers, where $k=2^m$, where each of the p hash values corresponds to a set of k registers.

5. The method of claim 4, wherein generating the interaction vector comprises generating p interaction vectors, wherein each coordinate of the p interaction vectors corresponds to a kth register in a pth set of registers.

6. The method of claim 1, wherein determining a value of m-bits of the hash value comprises determining the least significant bits of the hash value.

7. The method of claim 1, wherein the interaction vector comprises a plurality of coordinates, each coordinate of the interaction vector being equal to a count of the corresponding kth register, and wherein generating the interaction vector includes subtracting, from each coordinate of the interaction vector, a value equal to a number of user identifiers divided by k.

8. The method of claim 1, wherein the interaction vector comprises a plurality of coordinates, each coordinate of the interaction vector being equal to a count of a corresponding kth register includes adding, and wherein generating the interaction vector, to each coordinate of the interaction vector, a noise function based on one or more parameters.

9. The method of claim 1, wherein transmitting, via a network, the generated interaction vector includes transmitting a number of user identifiers identifying interaction with the set of content items.

10. The method of claim 5, wherein transmitting, via a network, the generated interaction vector includes transmitting p interaction vectors.

11. A system comprising one or more processors, the processors configured to:
receive, based on a request from a requesting party, a set of hash functions;
retrieve a plurality of user identifiers, each of the user identifiers identifying one or more interactions with the set of content items by a respective user identifier of the plurality of user identifiers;
generate a user vector for each respective user identifier of the plurality of user identifiers by:
generating a first hash value of a respective user identifier using a first hash function of the set of k hash functions included in a request from the requesting party;
generating a second hash value of the respective user identifier using a second hash function of the set of k hash functions included in the request from the requesting party;
generating a user vector, comprising k coordinates, wherein a first coordinate of the user vector comprises a subset of bits of the first hash value and a second coordinate of the user vector comprises a subset of bits of the second hash value, wherein each coordinate of the user vector contains no specific information about individual user identifiers or specific interactions of the user identifier with a content item of the set of content items;
generate an interaction vector by summing the plurality of generated user vectors generated for each respective user identifier; and
transmit the generated interaction vector to the requesting party, wherein the generated interaction vector provides anonymous data about a plurality of user interactions with the set of content items from a plurality of content delivery platform without revealing the user identifier to the requesting party, wherein the generated interaction vector is used to estimate a number of unique user interactions with the set of content items based on the generated interaction vector and a second interaction vector associated with a third-party.

12. The system of claim 11, wherein the one or more processors are configured to:
receive, via a network, data to identify the set of hash functions, and receive data to identify the set of content items.

13. The system of claim 12, wherein the one or more processors are configured to:
retrieve only a plurality of user identifiers that identify interactions with the set of content items identified by the received data.

14. The system of claim 11, wherein the one or more processors are configured to:
generate p hash values for each of the plurality of the user identifiers, wherein the p hash values correspond to a respective hash function in the set of hash functions,
determine a value of m-bits for each of the p hash values, and
increment a count of a register corresponding to the value, the register being one of k registers, where $k=2^{\wedge}m$, where each of the p hash values corresponds to a set of k registers.

15. The system of claim 14, wherein the one or more processors are configured to:
generate p interaction vectors, wherein each coordinate of the p interaction vectors corresponds to a kth register in a pth set of registers.

16. The system of claim 11, wherein the one or more processors are configured to:
determine a value of m-bits of the hash value by determining the least significant bits of the hash value.

17. The system of claim 11, wherein the one or more processors are configured to:
generate an interaction vector, each coordinate of the interaction vector being equal to a count of the corresponding kth register, and subtract, from each coordinate of the interaction vector, a value equal to a number of user identifiers divided by k.

18. The system of claim 11, wherein the one or more processors are configured to:
generate the interaction vector, each coordinate of the interaction vector being equal to a count of the corresponding kth register, and add, to each coordinate of the interaction vector, a noise function based on one or more parameters.

19. The system of claim 11, wherein the one or more processors are configured to:
transmit, via a network, the generated interaction vector and a number of user identifiers identifying interaction with the set of content items.

20. The system of claim 15, wherein the one or more processors are configured to:
transmit, via a network, the generated p interaction vectors.

* * * * *